(12) United States Patent
Arumugam et al.

(10) Patent No.: US 10,600,337 B2
(45) Date of Patent: Mar. 24, 2020

(54) INTELLIGENT CONTENT PARSING WITH SYNTHETIC SPEECH AND TANGIBLE BRAILLE PRODUCTION

(71) Applicant: Bank of America Corporation, Charlotte, NC (US)

(72) Inventors: Kannan Arumugam, Fort Mill, SC (US); Sasidhar Purushothaman, Hyderabad (IN); Jason M. Ackiss, Charlotte, NC (US); Sudhapriya Panuganti, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 394 days.

(21) Appl. No.: 15/420,699

(22) Filed: Jan. 31, 2017

(65) Prior Publication Data

US 2018/0218726 A1 Aug. 2, 2018

(51) Int. Cl.
*G06F 17/00* (2019.01)
*G09B 21/00* (2006.01)
*G09B 5/04* (2006.01)
*G06F 16/9535* (2019.01)
*G06F 16/957* (2019.01)

(52) U.S. Cl.
CPC ......... *G09B 21/007* (2013.01); *G06F 16/957* (2019.01); *G06F 16/9535* (2019.01); *G09B 5/04* (2013.01)

(58) Field of Classification Search
CPC .. G06F 16/957; G06F 16/9535; G09B 21/007
See application file for complete search history.

(56) References Cited

U.S. PATENT DOCUMENTS 7,952,607 B2 5/2011 Baker
8,996,376 B2 3/2015 Fleizach et al.
(Continued)

OTHER PUBLICATIONS

Jun Strumpflohner. How to add a reading time indicator to your blog in ten minutes. <https://web.archive.org/web/20160128160730/https://juristr.com/blog/2013/07/how-to-setup-reading-time-indicator-ten-minutes/> (Year: 2013).*

(Continued)

*Primary Examiner* — Syed H Hasan
(74) *Attorney, Agent, or Firm* — Banner & Witcoff, Ltd.; Michael A. Springs

(57) ABSTRACT

Aspects of the disclosure relate to parsing page content to determine tag sequences and synthesizing content associated with the determined tag sequences to produce audio and/or braille output relative to user preferences and input. In a first embodiment, a user computing device may receive a page document corresponding to a uniform resource locator (URL) of the third party computing platform, identify one or more tag sequences of the page document, calculate an expected reading time for each of the one or more tag sequences, generate a summary associated with each of the one or more tag sequences of the page document, and produce an output of the summary. In a second embodiment, a server infrastructure may activate an interface with the user computing device and may perform the aforementioned processes in order to increase processing efficiency and decrease computing load at the user computing device.

21 Claims, 14 Drawing Sheets

(56) References Cited

U.S. PATENT DOCUMENTS

| | | | |
|---|---|---|---|
| 9,002,924 B2 | 4/2015 | Saretto et al. | |
| 9,135,333 B2* | 9/2015 | Cameron | G11B 27/034 |
| 9,443,199 B2 | 9/2016 | Pinckney et al. | |
| 9,680,945 B1* | 6/2017 | Treves | H04L 67/22 |
| 9,830,085 B1* | 11/2017 | Hasegawa | G06F 3/0611 |
| 2004/0205614 A1* | 10/2004 | Keswa | H04L 63/08 |
| | | | 715/239 |
| 2005/0034063 A1* | 2/2005 | Baker | G06F 16/9562 |
| | | | 715/241 |
| 2009/0094561 A1* | 4/2009 | Do | G06F 3/0425 |
| | | | 715/863 |
| 2014/0289241 A1* | 9/2014 | Anderson | G06F 16/48 |
| | | | 707/736 |
| 2016/0078442 A1 | 3/2016 | Shintani et al. | |
| 2016/0080589 A1 | 3/2016 | Talwerdi | |
| 2016/0086516 A1 | 3/2016 | Beranek | |
| 2016/0088101 A1 | 3/2016 | Batiste et al. | |
| 2016/0092036 A1 | 3/2016 | Rodgers et al. | |
| 2016/0092433 A1 | 3/2016 | Gluck et al. | |
| 2016/0098427 A1 | 4/2016 | Vargas et al. | |
| 2016/0105576 A1 | 4/2016 | Osawa | |
| 2016/0116417 A1 | 4/2016 | Gibbons et al. | |
| 2016/0132795 A1 | 5/2016 | Elliott et al. | |
| 2016/0133150 A1 | 5/2016 | Sutz | |
| 2016/0146833 A1 | 5/2016 | Dahl et al. | |
| 2016/0147544 A1 | 5/2016 | Kaplan et al. | |
| 2016/0148409 A1 | 5/2016 | Fleizach et al. | |
| 2016/0163120 A1 | 6/2016 | Hilton et al. | |
| 2016/0163211 A1 | 6/2016 | Piper et al. | |
| 2016/0179861 A1 | 6/2016 | Briggs et al. | |
| 2016/0179957 A1 | 6/2016 | Briggs et al. | |
| 2016/0202272 A1 | 7/2016 | Dahl et al. | |
| 2016/0203117 A1 | 7/2016 | Haine et al. | |
| 2016/0205419 A1 | 7/2016 | Ricci et al. | |
| 2016/0218537 A1 | 7/2016 | Kondo et al. | |
| 2016/0232151 A1 | 8/2016 | Blackmon | |
| 2016/0232363 A1 | 8/2016 | Gramelspacher et al. | |
| 2016/0246893 A1 | 8/2016 | Codignotto | |
| 2016/0247341 A1 | 8/2016 | Talwerdi | |
| 2016/0253293 A1 | 9/2016 | Gluck et al. | |
| 2016/0261475 A1 | 9/2016 | Jadhav et al. | |
| 2016/0275926 A1 | 9/2016 | Batiste et al. | |
| 2016/0275937 A1 | 9/2016 | Bells et al. | |
| 2016/0283846 A1 | 9/2016 | Keohane et al. | |
| 2016/0283847 A1 | 9/2016 | Keohane et al. | |
| 2016/0300189 A1 | 10/2016 | Ferreira De Souza et al. | |
| 2016/0306784 A1 | 10/2016 | Bradley et al. | |
| 2016/0321117 A1 | 11/2016 | Narayanan et al. | |
| 2016/0335044 A1 | 11/2016 | Abou Mahmoud et al. | |
| 2016/0336003 A1 | 11/2016 | Agiomyrgiannakis et al. | |
| 2016/0337426 A1 | 11/2016 | Shribman et al. | |
| 2016/0357354 A1 | 12/2016 | Chen et al. | |
| 2016/0357420 A1 | 12/2016 | Wilson et al. | |
| 2016/0357717 A1 | 12/2016 | Metz et al. | |
| 2016/0359874 A1 | 12/2016 | Black et al. | |
| 2016/0373826 A1 | 12/2016 | Jayaram | |
| 2016/0378274 A1 | 12/2016 | Akiner et al. | |
| 2016/0378275 A1 | 12/2016 | Akiner et al. | |
| 2016/0378300 A1 | 12/2016 | Frem et al. | |
| 2016/0378720 A1* | 12/2016 | Bacus | G06F 17/211 |
| | | | 715/251 |
| 2017/0011241 A1 | 1/2017 | Vargas et al. | |
| 2017/0014822 A1 | 1/2017 | Ker | |
| 2017/0019546 A1 | 1/2017 | Tse et al. | |
| 2017/0024359 A1 | 1/2017 | Gagliano et al. | |
| 2018/0218726 A1* | 8/2018 | Arumugam | G09B 5/04 |

OTHER PUBLICATIONS

Jason Yingling. Reading Time WP. <https://web.archive.org/web/20150101144456/https://wordpress.org/plugins/reading-time-wp/> (Year: 2015).*

Formisimo. Fast, easy-to-install and in-depth form analytics. 2015. https://web.archive.org/web/20161104154441/http://www.formisimo.com/blog/form-analytics-made-easy/ (Year: 2015).*

* cited by examiner

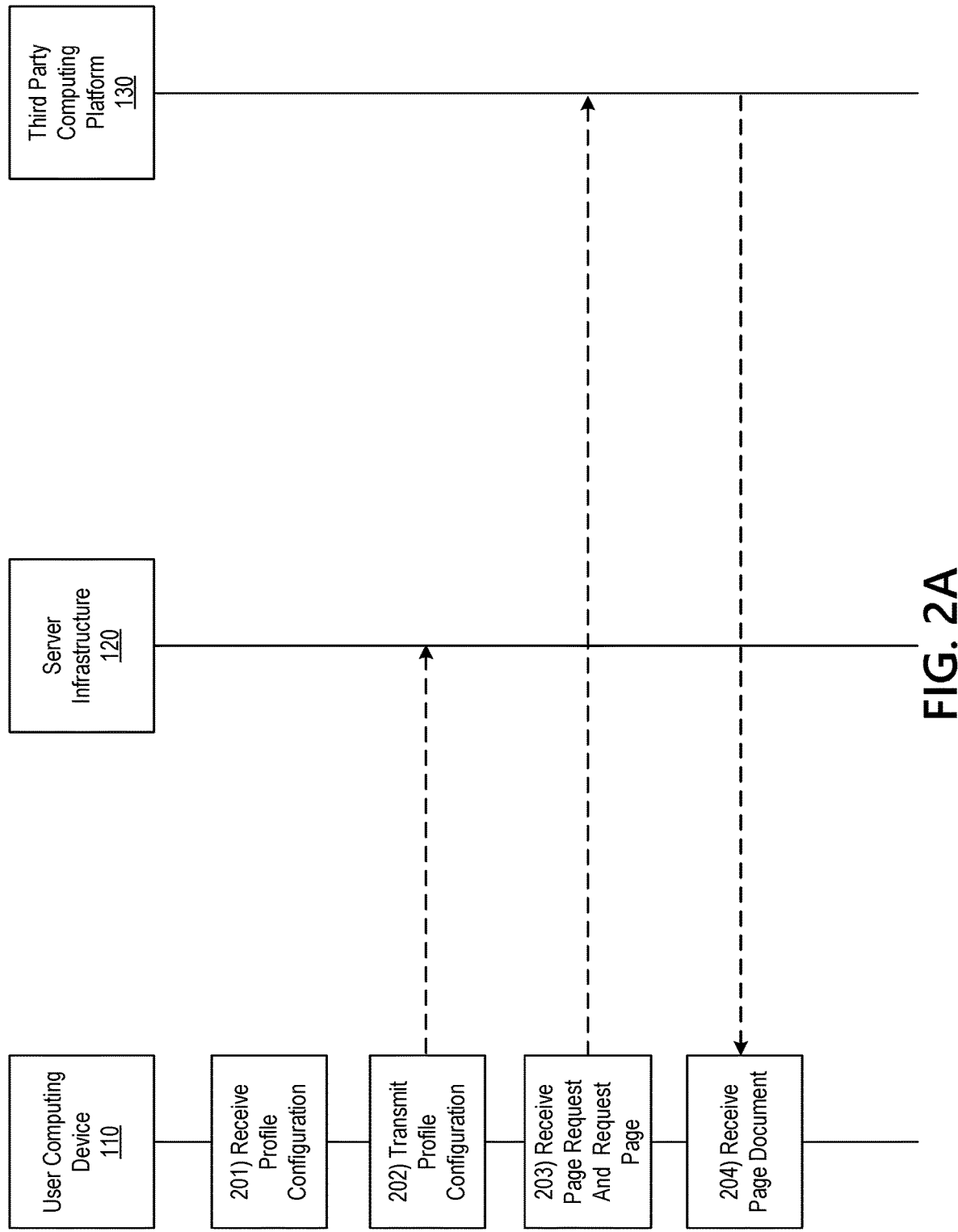

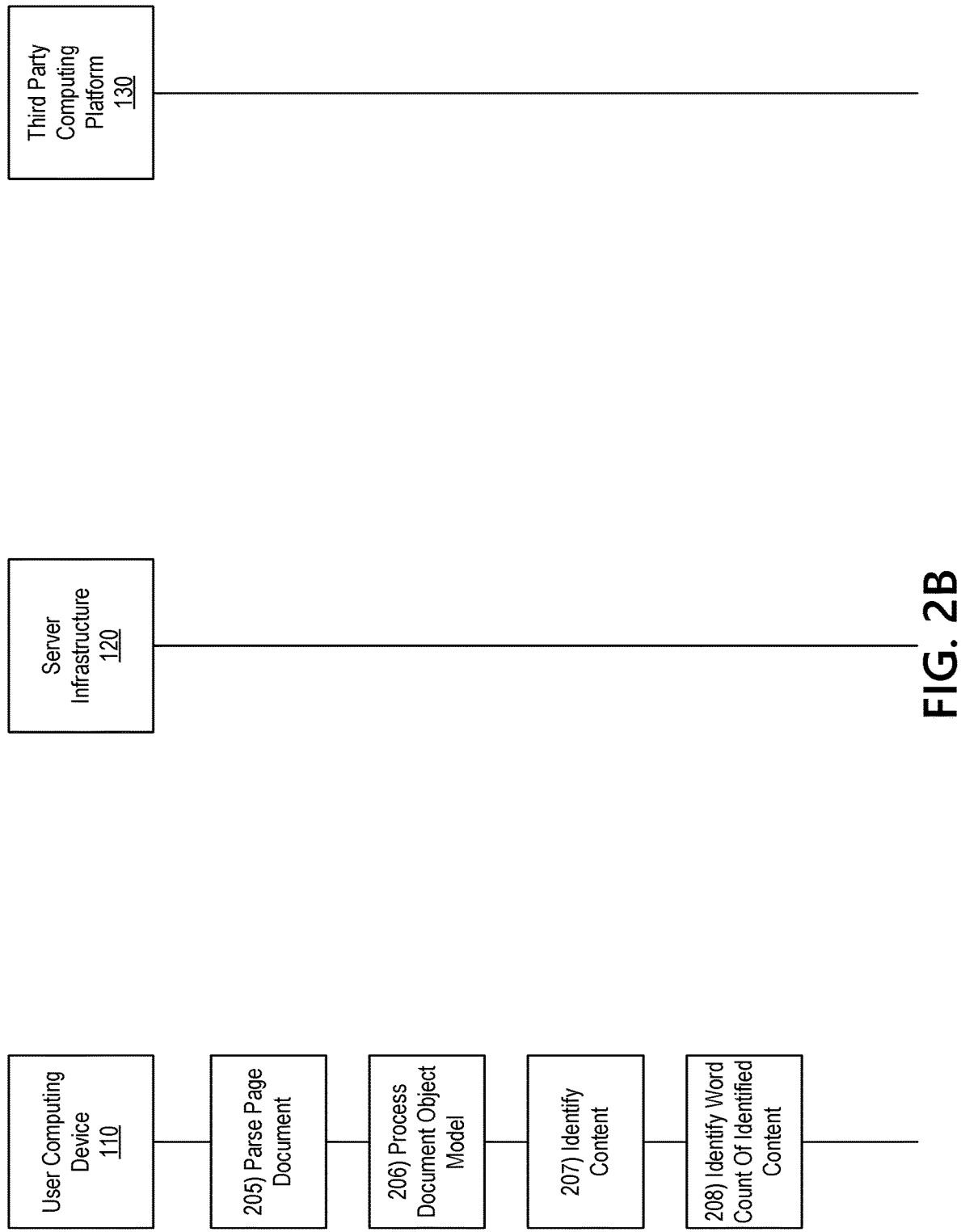

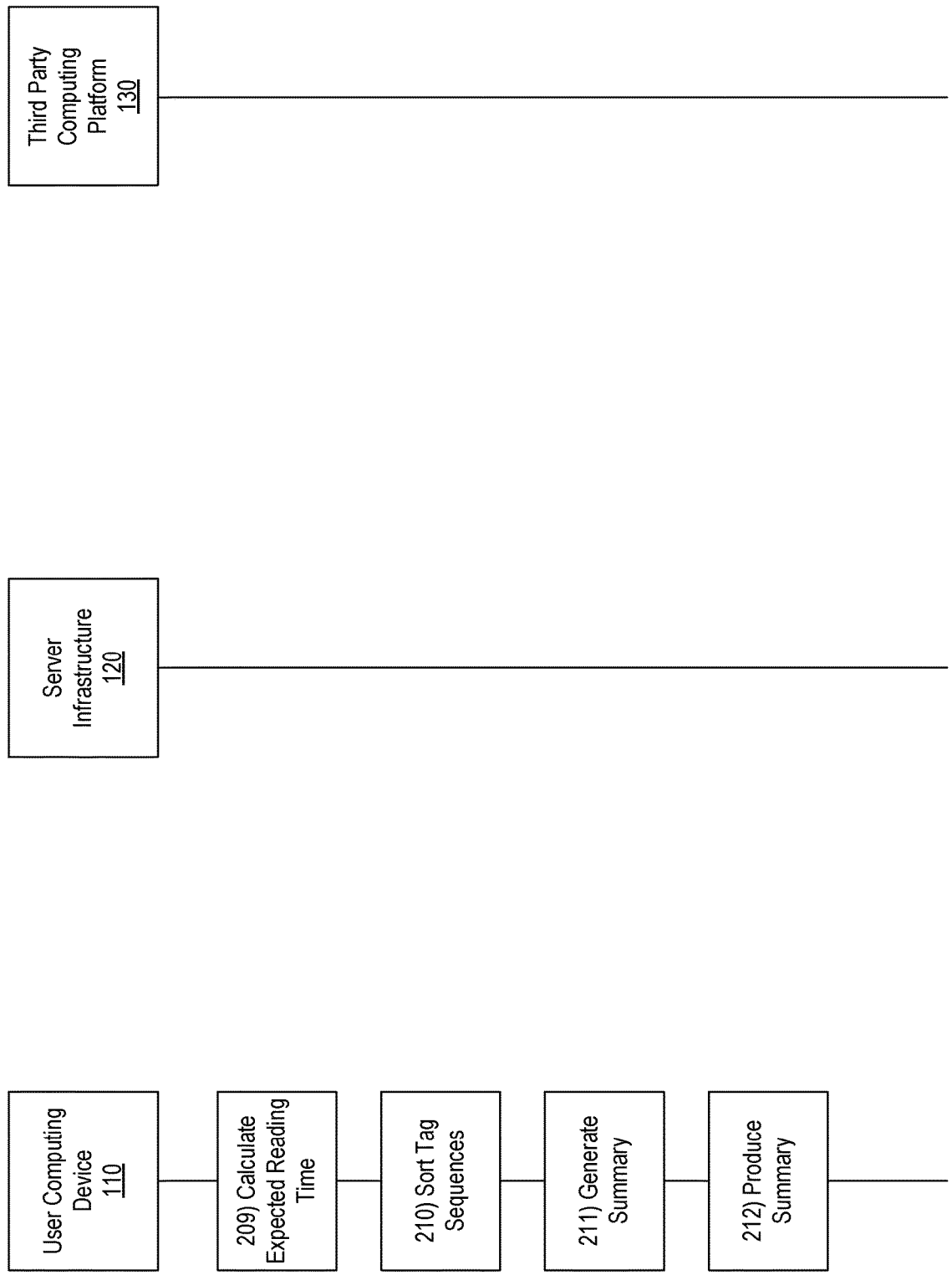

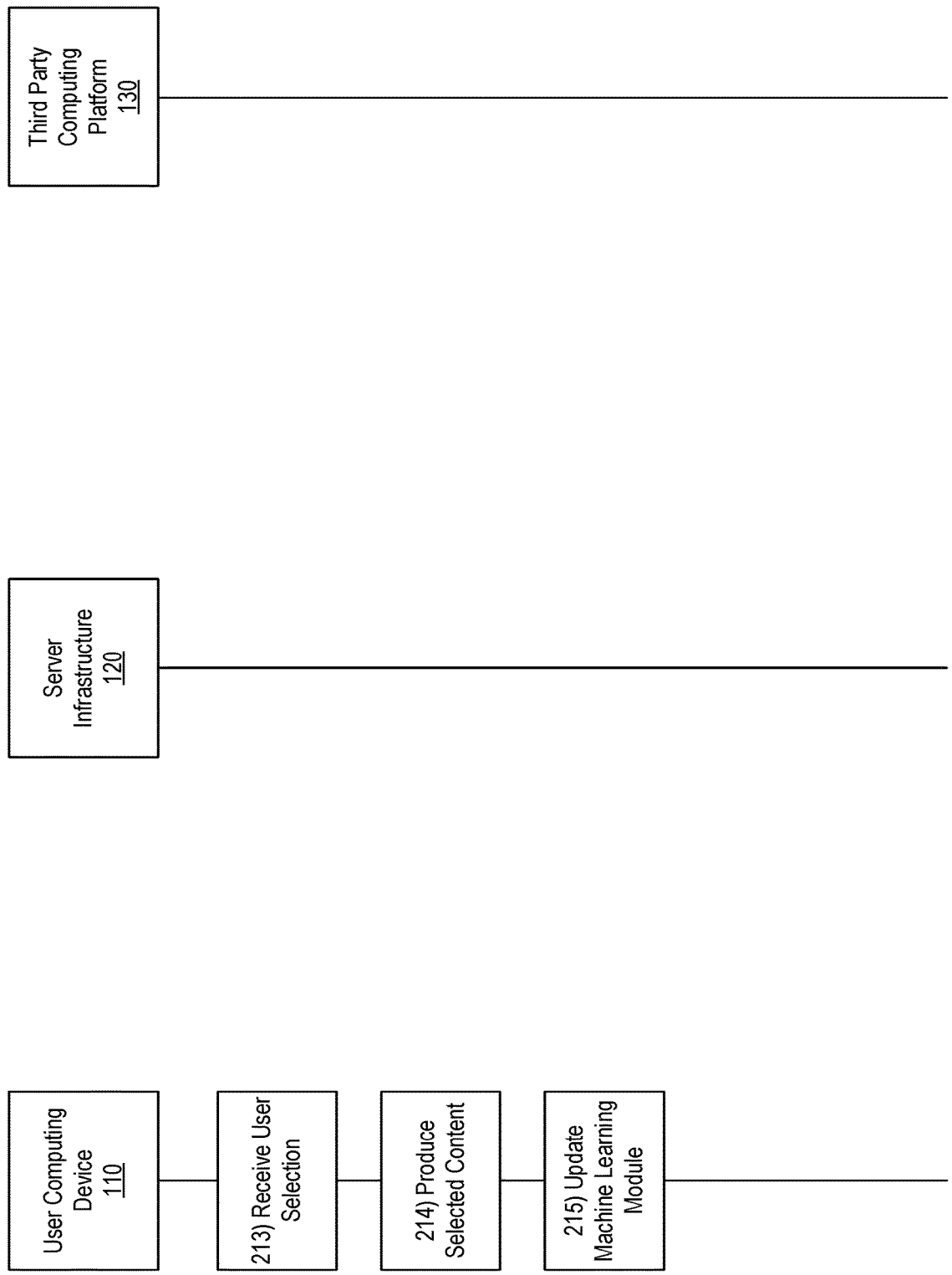

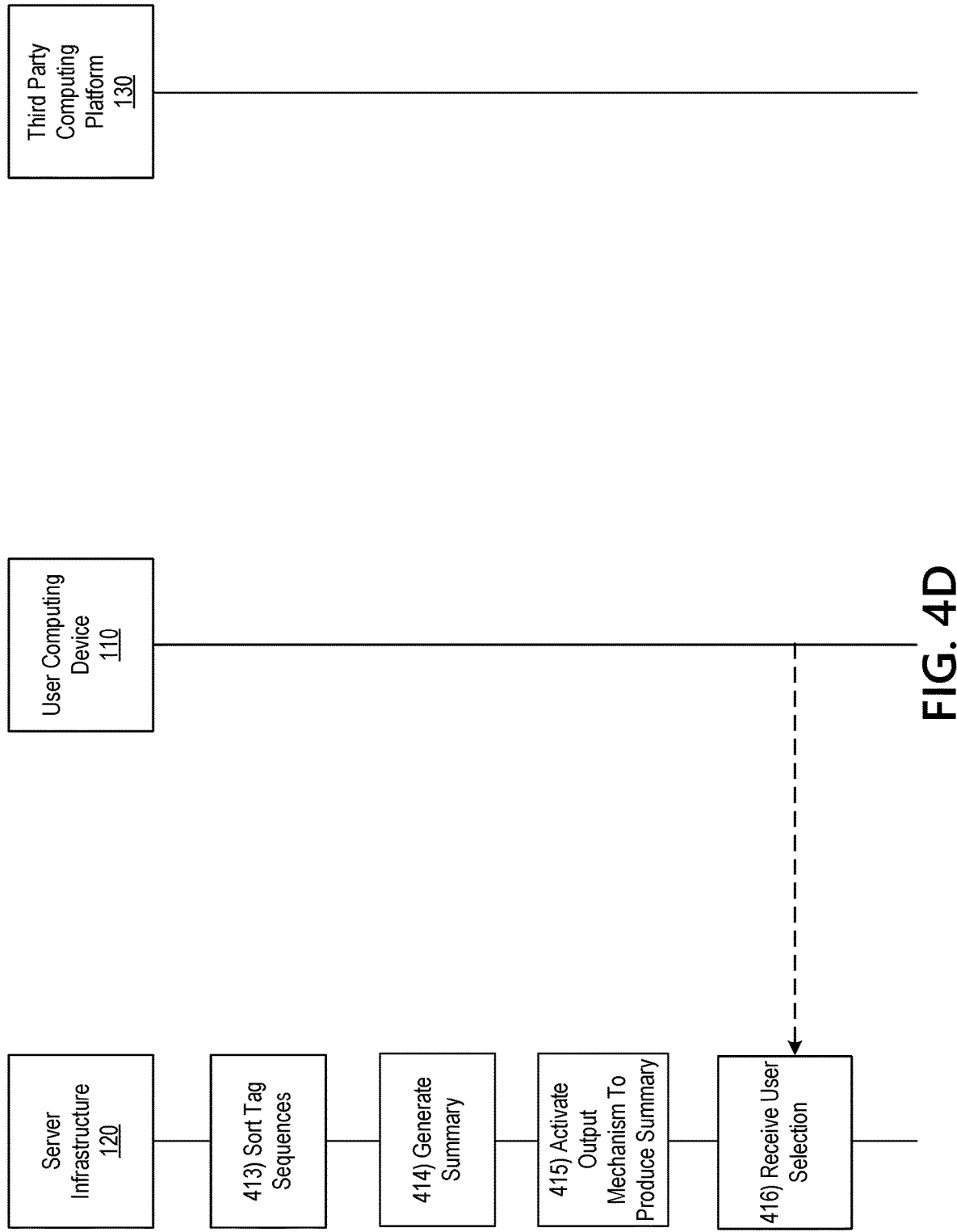

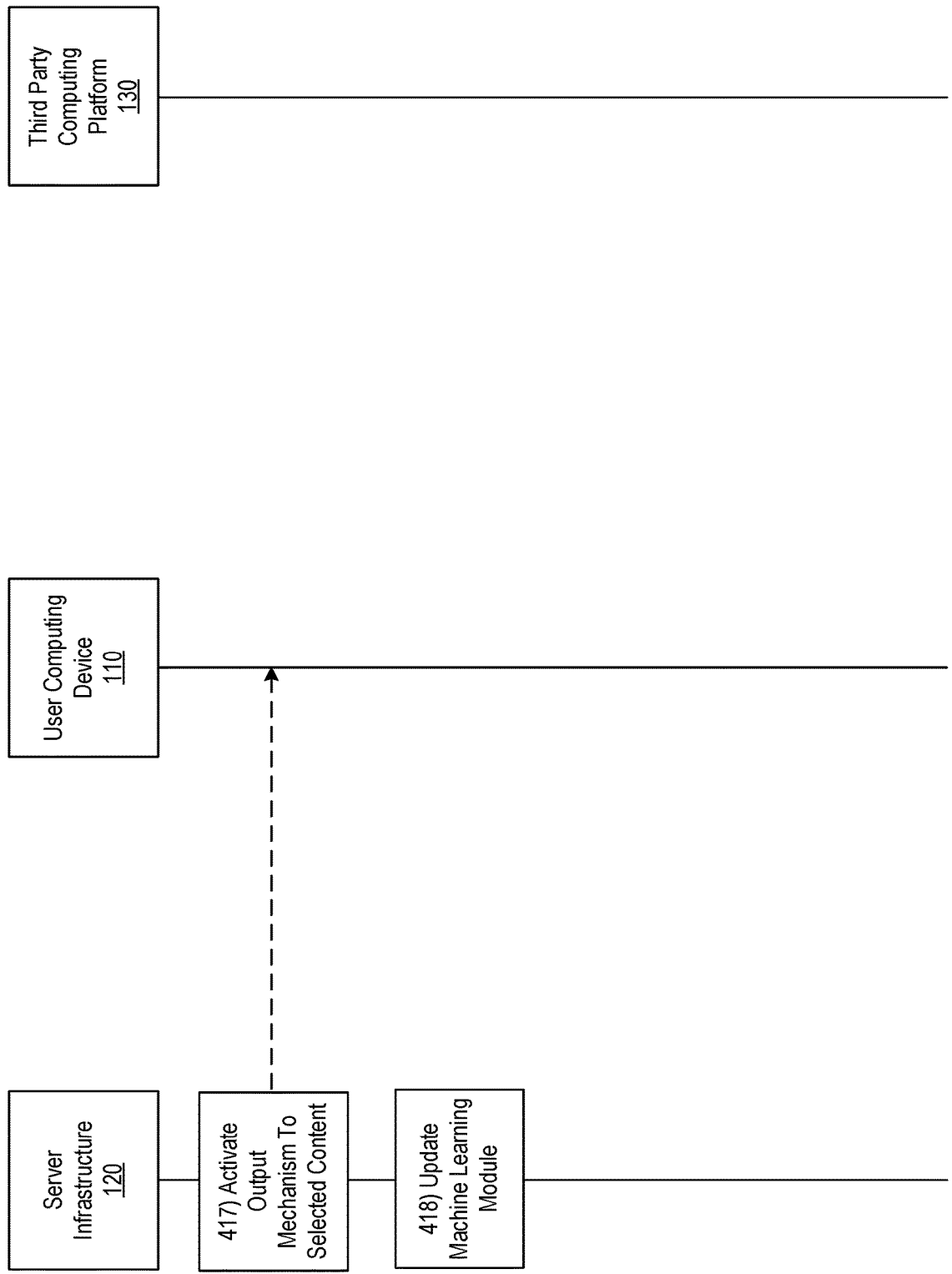

INTELLIGENT CONTENT PARSING WITH SYNTHETIC SPEECH AND TANGIBLE BRAILLE PRODUCTION

FIELD

Aspects of the disclosure relate to electrical computers, digital processing systems, multicomputer data transferring, and synthetic speech and tangible braille production. In particular, one or more aspects of the disclosure relate to parsing page content to determine tag sequences and synthesizing content associated with the determined tag sequences to produce audio and/or braille output relative to user preferences and input.

BACKGROUND

Screen readers enable people who are blind, visually impaired, unable to read, and/or affected by learning disabilities to engage with the internet by converting the text of web content into synthesized speech and/or tangible braille. While existing screen readers have provided a positive impact in the lives of many people, there are many technological deficiencies that need to be addressed. In particular, known screen readers operate by converting web content to speech and/or braille in a top-to-bottom manner without regard for the relevance of the content as determined by the end user. Thus, as a result of top-to-bottom reproduction methods, users are bound to the predetermined flow of content reproduction, regardless of the position of content of interest to the user within the predetermined flow.

SUMMARY

Aspects of the disclosure address these and/or other technological shortcomings by providing an intelligent content parsing and synthetic speech and tangible braille production system configured to parse and reproduce page content relative to user preferences and input.

In particular, one or more aspects of the disclosure provide effective, efficient, scalable, and convenient technical solutions that address and overcome the technical problems associated with known screen readers using top-to-bottom content reproduction methods. For example, one or more aspects of the disclosure provide techniques for parsing page content to determine tag sequences and for synthesizing content associated with the determined tag sequences for audio and/or braille output relative to user preferences and input.

In accordance with one or more embodiments, a computing device having at least one processor, at least one output mechanism, a memory, and a communication interface may receive, via the communication interface, from a third party computing platform, a page document corresponding to a uniform resource locator (URL) of the third party computing platform. Subsequently, the computing device may identify one or more tag sequences of the page document, wherein each of the one or more tag sequences include a start tag, an end tag, and content therebetween. Next, the computing device may calculate an expected reading time for each of the one or more tag sequences based on the content included between the start tag and the end tag. Then, the computing device may generate a summary associated with each of the one or more tag sequences of the page document, wherein the summary comprises a recapitulation of the content between the start tag and the end tag and the expected reading time. Subsequently, the computing device may produce, via the at least one output mechanism, an output of the summary.

In some embodiments, to identify the one or more tag sequences of the page document, the computing device may parse the page document corresponding to the URL of the third party computing platform to generate a document object model (DOM) of the page document including the one or more tag sequences. Subsequently, the computing device may process the DOM of the page document to classify each of the one or more tag sequences based on a type of tag sequence.

In some embodiments, to calculate the expected reading time for each of the one or more tag sequences based on the content included between the start tag and the end tag, the computing device may identify the content included between the start tag and end tag as being text content. Then, responsive to identifying the content as being text content, the computing device may process the text content to produce a total word count of the text content. Subsequently, the computing device may compare the total word count of the text content with a predetermined word per minute rate to determine the expected reading time In some embodiments, the at least one output mechanism is a speaker, and to produce the output of the summary, the computing device may cause the speaker to produce sound corresponding to the summary.

In some embodiments, the at least one output mechanism is a refreshable braille display, and to produce the output of the summary, the computing device may cause the refreshable braille display to produce tangible braille characters corresponding to the summary.

In some embodiments, the computing device may further have at least one input module and, prior to receiving the page document from the third party computing platform, the computing device may receive, via the at least one input module, from a user of the computing device, information corresponding to one or more profile configurations associated with the user. Next, the computing device may sort the identified one or more tag sequences of the page document in an order from a first tag sequence to a last tag sequence based on the information corresponding to the one or more profile configurations associated with the user, wherein the summary associated with each of the one or more tag sequences of the page document is generated in the sorted order, and wherein the output of the summary is produced in the sorted order.

In some embodiments, after producing the output of the summary in the sorted order, the computing device may receive, via the at least one input module, from the user of the computing platform, a selection of at least one of the one or more tag sequences. Subsequently, the computing device may produce, via the at least one output mechanism, an output of the content between the start tag and the end tag of the tag sequence in a timeframe corresponding to the expected reading time.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 2A, 2B, 2C, and 2D depict a first illustrative event sequence for parsing page content and synthesizing content for audio and/or braille output in accordance with one or more example embodiments;

FIGS. 4A, 4B, 4C, 4D, and 4E depict a second illustrative event sequence for parsing page content and synthesizing content for audio and/or braille output in accordance with one or more example embodiments.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1A:
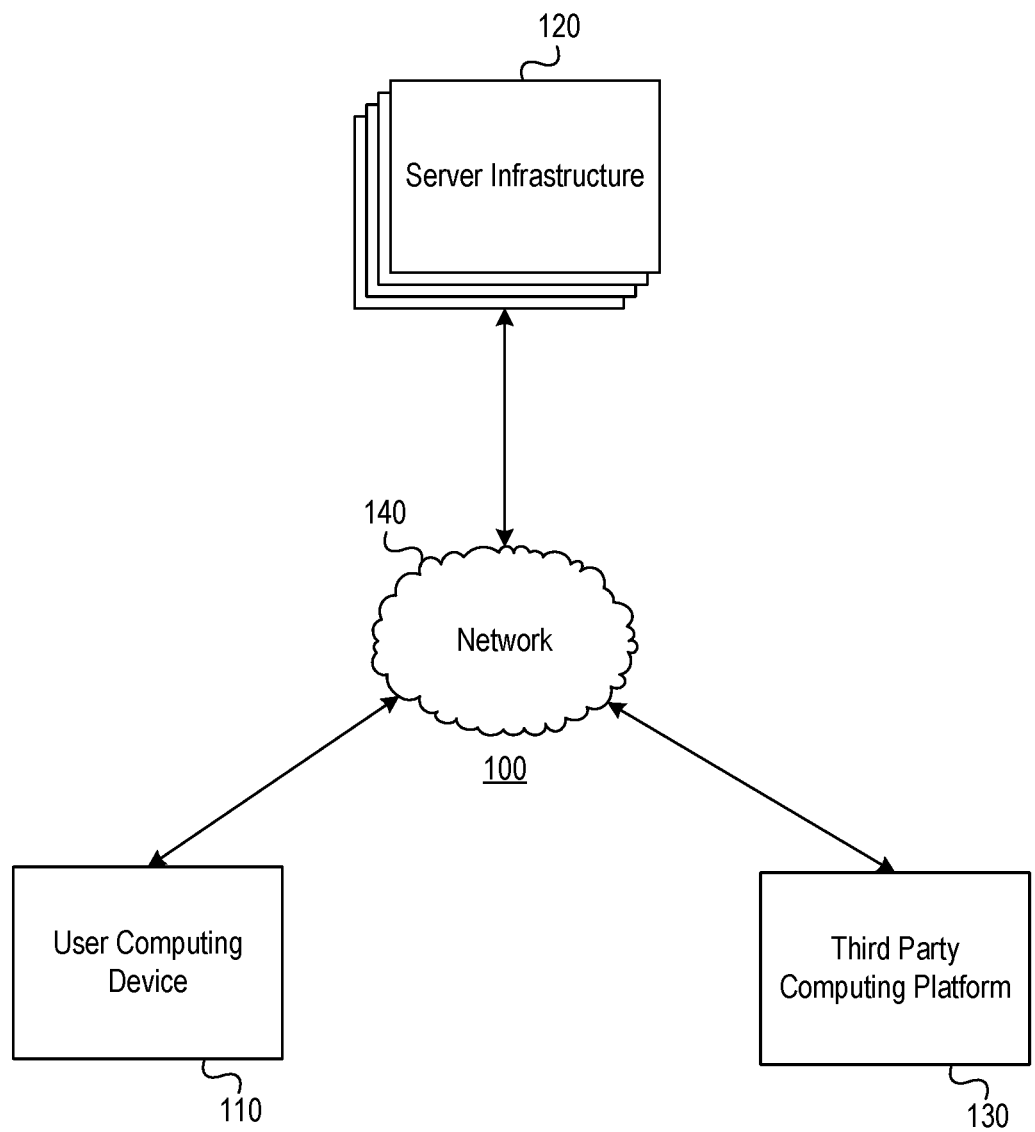
FIGS. 1A, 1B, and 1C depict an illustrative computing environment for parsing page content and synthesizing content for audio and/or braille output in accordance with one or more example embodiments.
Figure 1B:
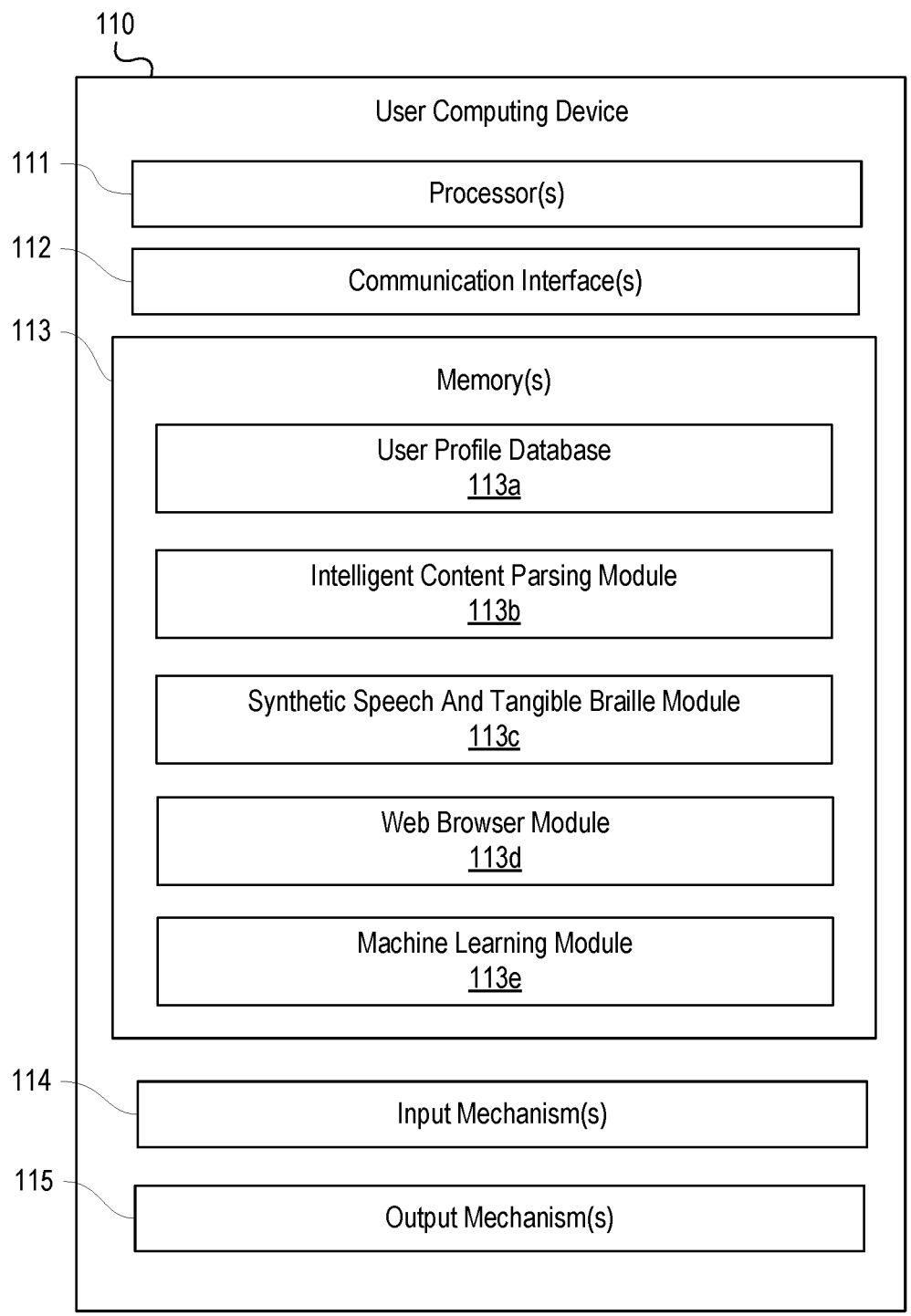
Figure 1C:
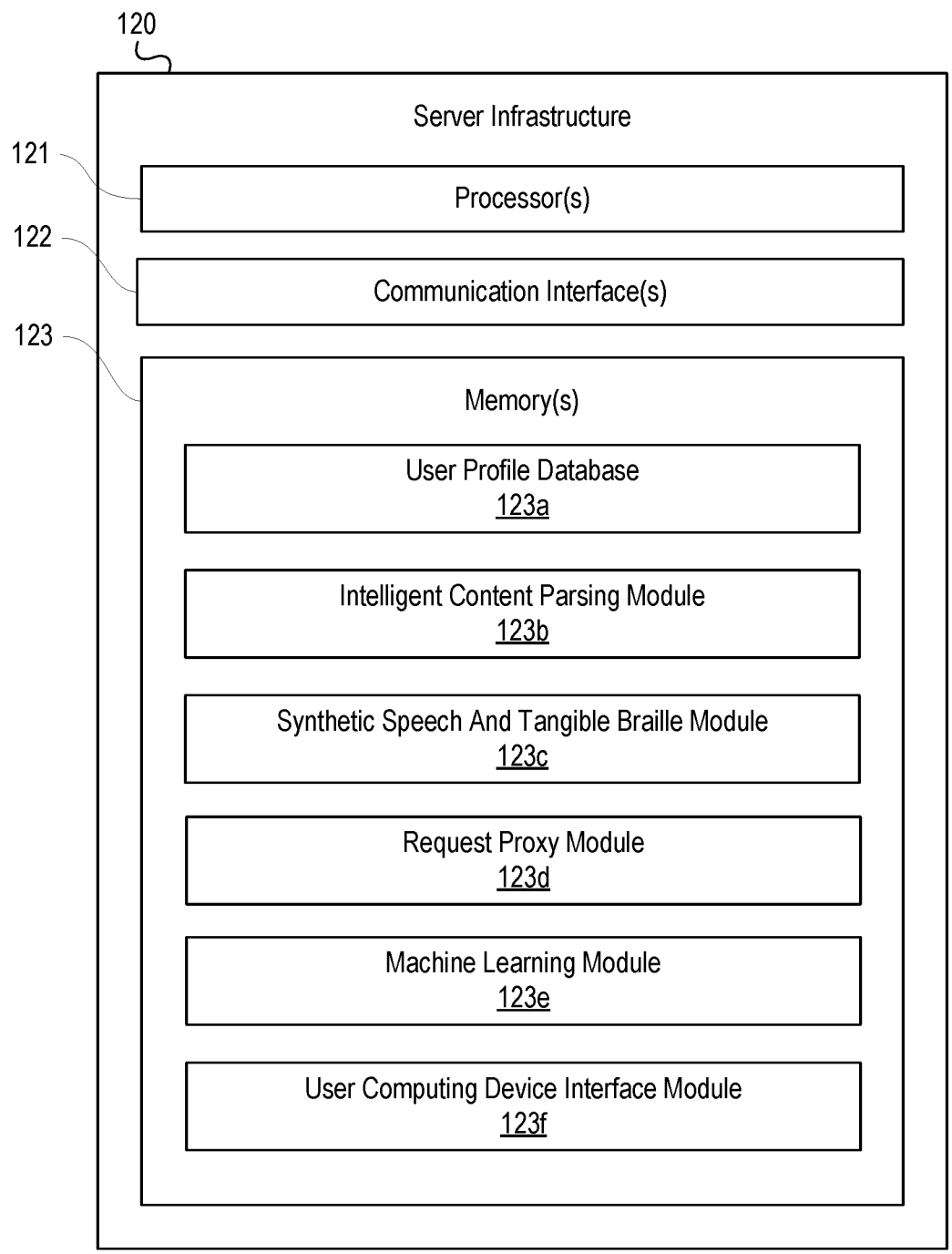

FIGS. 1A, 1B, and 1C depict an illustrative computing environment for parsing page content and synthesizing content for audio and/or braille output in accordance with one or more example embodiments.

Referring to FIG. 1A, computing environment 100 may include one or more computing devices and/or other computer systems. For example, computing environment 100 may include user computing device 110, server infrastructure 120, and a third party computing platform 130. Each of user computing device 110, server infrastructure 120, and third party computing platform 130 may be configured to communicate with each other, as well as with other computing devices, through network 140.

User computing device 110 may be configured to receive and transmit information corresponding to a web page request, receive a page document in response to the web page request, identify tag sequences of the page document, calculate an expected reading time of the tag sequences, generate a summary of content of the tag sequences, produce an output of the summary, and/or perform other functions, as discussed in greater detail below. In some instances, user computing device 110 may perform such processes independently, or in combination with server infrastructure 120 and/or third party computing platform 130.

Server infrastructure 120 may include a plurality of computer servers and associated server hardware that may host various applications configured to receive, transmit, and/or store data, control and/or direct actions of other devices and/or computer systems (e.g., user computing device 110), and/or perform other functions, as discussed in greater detail below. In some arrangements, server infrastructure 120 may include and/or make up enterprise information technology infrastructure and may host a plurality of enterprise applications, enterprise databases, and/or other enterprise resources. Such applications may, for instance, be executed on one or more servers included in server infrastructure 120 using distributed computing technology and/or the like. In some instances, server infrastructure 120 may include a relatively large number of servers that may support operations of a particular enterprise or organization, such as a financial institution. In addition, and as discussed in greater detail below, various servers included in server infrastructure 120 may be configured to interface with user computing device 110 and/or third party computing platform 130. Through interfacing, server infrastructure 120 may perform various functions and store data related to parsing page content and synthesizing content for audio and/or braille output.

Third party computing platform 130 may include one or more computing devices configured to host one or more dynamic and/or static web pages and perform various functions associated with such web pages such as running operative scripts. Each of the one or more web pages associated with third party computing platform 130 may be identified by a uniform resource locator (URL) and may be defined by a page document written in a combination of one or more of programming languages (e.g., HTML, DHTML, CSS, JavaScript, Java, ActionScript, Flash, Python, PHP, Ruby, C++, C, Shell, C#, Objective C, VimL, Go, Perl, and the like). As such, the page document may include a plurality of tag sequences comprising a start tag, end tag, and content positioned therebetween such as text, forms, applications, images, audio tracks, PDF documents, Word documents, advertisements, table content, and videos, as well accompanying meta info, generated through parsing the page document into the document object model (DOM). While the third party computing platform 130 is described in the singular, in some instances, such a platform may relate to any of a plurality of platforms and the content associated therein forming a part of the World Wide Web.

In one or more arrangements, user computing device 110, server infrastructure 120, and third party computing platform 130 may be any type of computing device capable of receiving a user interface, receiving input via the user interface, and communicating the received input to one or more other computing devices. For example, user computing device 110, server infrastructure 120, and third party computing platform 130 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of user computing device 110, server infrastructure 120, and third party computing platform 130 may, in some instances, be special-purpose computing devices configured to perform specific functions.

As stated above, computing environment 100 also may include one or more networks, which may interconnect one or more of user computing device 110, server infrastructure 120, and third party computing platform 130. For example, computing environment 100 may include network 140. Network 140 may include one or more sub-networks (e.g., local area networks (LANs), wide area networks (WANs), or the like).

Referring to FIG. 1B, user computing device 110 may include processor(s) 111, communication interface(s) 112, memory 113, input mechanism(s) 114, and output mechanism(s) 115. A data bus may interconnect processor(s) 111, communication interface(s) 112, memory 113, input mechanism(s) 114, and output mechanism(s) 115. Communication interface(s) 112 may be a network interface configured to support communication between user computing device 110 and one or more networks (e.g., network 140). Input mechanism(s) 114 may include one or more of a microphone, keypad, touch screen, mouse, stylus, and/or any other mechanism through which a user of the user computing device 110 may provide input to user computing device 110. Output mechanism(s) 115 may include one or more of a speaker, refreshable braille display, video display device, for providing output of textual, audiovisual and/or graphical feedback to a user of user computing device 110. In some instances, the output mechanism(s) 115 may be hybrid input/output mechanisms configured to provide an output of information from user computing device 110, as well as receive a user input to user computing device 110, such as a touchscreen.

Memory 113 may include one or more program modules having instructions that when executed by processor(s) 111 cause user computing device 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of user computing device 110. For example, memory 113 may have, store, and/or include a user profile database 113a, intelligent content parsing module 113b, synthetic speech and tangible braille module 113c, web browser module 113d, and machine learning module 113e.

User profile database 113a may store information corresponding to a user of user computing device 110 as pertaining to the user's usage of the intelligent content parsing module 113b, synthetic speech and tangible braille module 113c, web browser module 113d, and machine learning module 113e, as described in further detail below. In particular, user profile database 113a may store data corresponding to the user's preferences in regard to the manner in which the intelligent content parsing module 113b, synthetic speech and tangible braille module 113c, web browser module 113d, and machine learning module 113e perform their respective functions.

Intelligent content parsing module 113b may have instructions that direct and/or cause user computer device 110 to parse page content received at web browser module 113d from server infrastructure 120 and/or third party computing platform 130 by way communication interface(s) 112 according to predetermined settings and/or user preference data stored in user profile database 113a. Additionally, intelligent content parsing module 113b may perform other functions, as discussed in greater detail below.

Synthetic speech and tangible braille module 113c may have instructions that direct and/or cause user computing device 110 to synthesize text received from server infrastructure 120 and/or third party computing platform 130 and parsed by intelligent content parsing module 113b into synthetic speech and/or tangible braille. Synthetic speech and tangible braille module 112c may also be configured to cause output mechanism(s) 115 to produce the synthesized text as synthetic speech and/or tangible braille. Additionally, synthetic speech and tangible braille module 113c may perform other functions, as discussed in greater detail below.

Web browser module 113d may have instructions that allow a user to provide web page request information to user computing device 110 via input mechanism(s) 114 and to direct and/or cause the user computing device 110 to transmit the information corresponding to the web page request via the communication interface(s) 112 to server infrastructure 120 and/or third party computing platform 130. Additionally, web browser module 113d may have further instructions which allow user computing device 110 to receive page documents from server infrastructure 120 and/or third party computing platform 130 via communication interface(s) 112 and to provide such page documents to intelligent content parsing module 113b. In some instances, web browser module 113d may have instructions which direct and/or cause the user computing device 110 to interface with server infrastructure 120 in order to enable the performance of the techniques for parsing page content, synthesizing content, and the like at server infrastructure 120, as will be described in further detail below.

Machine learning module 113e may have instructions that direct and/or cause user computing device 110 to set, define, and/or iteratively redefine user preferences, rules, and/or other parameters stored in user profile database 113a and used by intelligent content parsing module 113b, synthetic speech and tangible braille module 113c, and web browser module 113d of user computing device 110 and/or other systems in computing environment 100 in parsing page content, synthesizing content, and the like.

Referring to FIG. 1C, server infrastructure 120 may include processor(s) 121, communication interface(s) 122, and memory 123. Communication interface(s) 122 may be a network interface configured to support communication between server infrastructure 120 and one or more networks (e.g., network 140). Memory 123 may include one or more program modules having instructions that when executed by processor(s) 121 cause server infrastructure 120 to monitor and/or manage one or more servers included in server infrastructure 120, as well as to perform one or more other functions described herein. For example, memory 123 may have, store, and/or include a user profile database 123a, intelligent content parsing module 123b, synthetic speech and tangible braille module 123c, request proxy module 123d, machine learning module 123e, and user computing device interface module 123f.

In some arrangements, as will be described in further detail below, server infrastructure 120 may be configured to interface with user computing device 110 to perform one or more aspects of the intelligent content parsing and synthetic speech and tangible braille production described herein. In such arrangements, web browser module 113d of user computing device 110 may be configured to access a URL associated with user computing device interface module 123f of server infrastructure 120. After an interface and/or connection between user computing device 110 and user computing device interface module 123f of server infrastructure 120 has been established, server infrastructure 120 may be configured to perform one or more aspects of the intelligent content parsing and synthetic speech and tangible braille production described herein using the user profile database 123a, intelligent content parsing module 123b, synthetic speech and tangible braille module 123c, request proxy module 123d, and machine learning module 123e.

For instance, a page request may be received from web browser module 113d of user computing device 110 at computing device interface module 123f of server infrastructure 120. The computing device interface module 123f, upon receiving the page request, may be configured to provide the request to request proxy module 123d which, in turn, may be configured to route the request to the intended destination (e.g., a URL associated with third party computing platform 130). Subsequently, the request proxy module 123d may be configured to receive a page document from the third party computing platform 130 on behalf of the web browser module 113d of user computing device 110. At such a point, user profile database 123a, intelligent content parsing module 123b, synthetic speech and tangible braille module 123c, and machine learning module 123e may be configured to interact with the page document in a manner similar to that described above in regard to the similar databases and/or modules of user computing device 110 (e.g., user profile database 113a, intelligent content parsing module 113b, synthetic speech and tangible braille module 113c, and machine learning module 113e). After processing of the page document has been performed, the server infrastructure 120, via user computing device interface module 123f, may be configured to activate output mechanism(s) 115 of user computer device 110 and instruct and/or cause user computing device 110 to produce synthetic speech and/or tangible braille.

By performing one or more aspects of the intelligent content parsing and synthetic speech and tangible braille production at server infrastructure 120, processing power may be conserved at user computing device 110. Additionally, by leveraging the computing capacity of server infrastructure 120, processing times may be decreased and processing efficiency may be increased. Moreover, in instances in which a plurality of user computing devices have processing performed at server infrastructure 120, machine learning module 123e may become more dynamic due to processing volume and end user experience may be improved.

FIGS. 2A, 2B, 2C, and 2D depict a first illustrative event sequence for parsing page content and synthesizing content for audio and/or braille output in accordance with one or more example embodiments. In the first illustrative event sequence, processing of a page document is focalized at user computing device 110. However, as mentioned above and described in further detail below, processing of a page document may, in some instances, be performed by user computing device 110 in combination with server infrastructure 120.

Referring to FIG. 2A, at step 201, user computer device 110 may receive user profile configuration information from a user via input mechanism(s) 114. User profile configuration information provided by the user may include one or more of a username, password, user type (e.g., age, gender, employment status, and the like), tag sequence preferences (e.g., header, paragraph, input, image, and the like), content preferences (e.g., sports, international news, entertainment, and the like), content type preferences (e.g., text, audio, video, and the like), summary order preferences (e.g., order of content of summary reproduced during output), content resumption preferences (e.g., where to commence content reproduction when landing on a web page for a second time), preferences to engage with hyperlinks to external pages, word per minute reproduction rate, and the like.

At step 202, the web browser module 113d of user computing device 110 may transmit the user profile configuration information to server infrastructure 120 via communication interface(s) 112. In some instances, prior to transmitting the user profile information received at step 201, user computing device 110 may compress and/or encrypt the user profile information. In such instances, user computing device 110 may compress the user profile information using prefix codes, Huffman codes, arithmetic coding, run-length coding, move-to-front coding, residual coding, context coding, Lempel-Ziv algorithms, Burrows Wheeler algorithms, scalar and vector quantization, and/or wavelet, fractal, and model-based compression and may encrypt the user profile information in accordance with SSL, Triple DES, RSA, Blowfish, Twofish, AES, or other symmetric encryption methods, asymmetric encryption methods, and hashing encryption methods.

Additionally and/or alternatively, user computing device 110 may store the user profile information locally in memory 113. In particular, user computing device 110 may store the user provided information in user profile database 113a of memory 113.

At step 203, after transmitting and/or storing the user profile information, user computing device 110 may receive a page request from a user for a particular URL associated with a web page of third party computing platform 130 at web browser module 113d via input mechanism(s) 114. Responsive to receiving the page request from the user, the web browser module 113d of the user computing device 110 may request the page corresponding to the URL from the third party computing platform 130 by transmitting the page request associated with the URL to the third party computing platform 130 by way of the communication interface(s) 112 through network 140. Subsequently at step 204, the web browser module 113d of the user computing device 110 may receive a page document from third party computing platform 130 corresponding to the URL of the page request provided at step 203.

Referring to FIG. 2B, at step 205, the intelligent content parsing module 113b of user computing device 110 may parse the page document corresponding to the URL of the third party computing platform 130 to generate a document object model (DOM) of the page document and produce one or more tag sequences. As stated above, each of the one or more tag sequences may comprise a start tag and an end tag. Situated in between the start tag and end tag, there may be positioned content such as text, forms, applications, images, audio tracks, PDF documents, Word documents, advertisements, table content, and videos, as well as meta data about the content.

At step 206, the intelligent content parsing module 113b of user computing device 110 may process the DOM of the page document to identify and/or classify each of the one or more tag sequences based on a type of tag sequence. For instance, the types of tag sequences may include title, body, header(s), paragraph(s), form(s), input(s), image(s), audio/video(s), link(s), list(s), table(s), style and semantic(s), meta info, script(s), applet(s), and the like. In some cases, the tag sequences may be identified and/or classified by the intelligent content parsing module 113b in relation to user preferences. For example, the intelligent content parsing module 113b may determine tag preferences of a user by extracting such information from user profile database 113a and/or requesting the user tag preference information from server platform 120 by way of communication interface(s) 112. In either case, the intelligent content parsing module 113b may then compare the DOM of the page document against the user's tag preferences to identify and/or classify each of the one or more tag sequences corresponding to the user's preferences. Alternatively, the intelligent content parsing module 113b may process the DOM of the page document to identify and/or classify each of the one or more tag sequences corresponding to one or more predetermined types of tag sequence (e.g., header, form, and the like).

At step 207, regardless of the manner in which the DOM was processed to identify and/or parse the tag sequences, the intelligent content parsing module 113b of user computing device 110 may identify content included between the start tag and end tag of the tag sequences. As stated above, such content may include text, forms, applications, images, audio tracks, PDF documents, Word documents, advertisements, table content, and videos, as well as any accompanying meta info. In some instances, the content may be identified by the intelligent content parsing module 113b based on the content preferences and/or content type preferences of the user. For instance, the intelligent content parsing module 113b may extract user content preference data and/or content type preference data from user profile database 113a and/or request such data from server infrastructure 120 by way of communication interface(s) 112. Subsequently, the intelligent content parsing module 113b may compare the content included between the start tag and end tag of each of the one or more tag sequences to the user content preference data and/or content type preference data to identify content within the page document pertinent to the user. As will be described in further detail below, such an identification of content as performed at step 207 may be assisted by machine learning module 113e.

At step 208, the intelligent content parsing module 113b may identify a word count of the content identified at step 207. In particular, the intelligent content parsing module 113b may extract textual information associated with the identified content of each of the one or more tag sequences. After doing so, the intelligent content parsing module 113b may process the extracted textual information associated with the identified content to determine a total word count associated with the identified content. In some instances, the total word count data may be extracted for each item of identified content.

In other instances, the content may be grouped according to sections (e.g., sports, news, technology, and the like) and the total word count data may be extracted corresponding to the totality of pieces of content within each of the particular sections. Additionally, with respect to non-text based content (e.g., images, audio tracks, videos, and the like), interactive content (e.g., fillable forms, applications, and the like), and/or junk content (e.g., advertisements and the like), the intelligent content parsing module 113b may be configured to identify a quantity associated with each type of content and information related thereto allowing for calculation and/or estimation of an estimated time of reproduction to be determined. For example, the intelligent content parsing module 113b may identify a total number of sections, fillable forms, fillable form fields, images, videos, audio tracks, PDF and Word documents, table content, and advertisements as well as meta data to be used in the calculation and/or estimation of an estimated time of reproduction.

Referring to FIG. 2C, at step 209, the intelligent content parsing module 113b of user computing device 110 may compare the total word count data of the identified content to the word per minute reproduction rate provided by the user at step 201 to calculate and/or determine an expected reading and/or reproduction time associated with each item of identified content. In instances in which a word per minute reproduction rate was not provided by the user, a predetermined baseline rate may be utilized.

In some cases, the intelligent content parsing module 113b may calculate and/or determine an expected reading and/or reproduction time for the identified total number of sections, fillable forms, fillable form fields, images, videos, audio tracks, PDF and Word documents, table content, and advertisements. In regard to the total number of fillable form fields, the intelligent content module 113b may further calculate and/or determine an expected time to provide inputs to the total number of fillable form fields. Additionally and/or alternatively, the intelligent content parsing module 113b calculate and/or determine an expected reading and/or reproduction time for the entire page document.

At step 210, the intelligent content parsing module 113b may sort the tag sequences of the DOM of the page document in an order from a first tag sequence to a last tag sequence based on one or more of the tag preference data, content preference data, content type preference data, summary order preference data, and content resumption preference data provided by the user.

At step 211, the intelligent content parsing module 113b of the user computing device 110 may generate a summary associated with each of the one or more tag sequences of the page document. In particular, the summary generated by the intelligent content parsing module 113b for each of the tag sequences may comprise a recapitulation of the content (e.g., a predetermined amount of words of the content) between the start tag and the end tag and the expected reading and/or reproduction time to produce the entirety of the content included in the tag sequence. In some instances, the summary associated with each of the one or more tag sequences of the page document is generated in the sorted order (e.g., in the sorted order based on one or more of the tag preference data, content preference data, content type preference data, summary order preference data, and content resumption preference data provided by the user). Thus, as described below, each of the one or more tag sequences of the page document of the summary may be reproduced for the user in the sorted order based on the preferences of the user. In doing so, the content of any given third party computing platform may be presented to the user, by user computing device 110, in an order determined by the user as opposed to a predetermined top-to-bottom manner. The user determined content reproduction method may provide the technical benefits of reducing processing load at computing device 110, as well as an accompanying reduction in energy expenditures associated with computing processing in comparison to predetermined top-to-bottom content reproduction methods. Furthermore, the user determined content reproduction method may be of a benefit to the user in that content of the highest meaning to the user is presented most immediately, regardless of the position of the content in the page document.

At step 212, the synthetic speech and tangible braille module 113c of the user computing device 110 may produce an output of the summary via the output mechanism(s) 115 in relation to the sorted order of the tag sequences of the summary. As stated above, the summary may include a recapitulation of the content (e.g., a predetermined amount of words of the content) between the start tag and the end tag and the expected reading and/or reproduction time to produce the entirety of the content included in the tag sequence. In some instances, the producing of the output by the synthetic speech and tangible braille module 113c may comprise instructing and/or causing a speaker of the user computing device 110 to produce sound corresponding to the summary. Additionally and/or alternatively, the producing of the output by the synthetic speech and tangible braille module 113c may comprise instructing and/or causing a refreshable braille display of the user computing device 110 to produce tangible braille characters corresponding to the summary.

In instances in which the producing of the output includes instructing and/or causing a speaker to produce sound corresponding to the summary, the synthetic speech and tangible braille module 113c may first perform text-to-speech synthesis of the summary. For instance, the synthetic speech and tangible braille module 113c may perform text analysis of the summary to develop an utterance composed of words. Subsequently, the synthetic speech and tangible braille module 113c may perform linguistic analysis on the utterance composed of words including phasing, intonation, and duration to produce an utterance composed of phonemes. Next, the synthetic speech and tangible braille module 113c may produce a wave form generation of the utterance composed of phonemes. After the wave form generation has been produced, the synthetic speech and tangible braille module 113c may instruct and/or cause the speaker to produce sound corresponding to the summary by transmitting the generated wave form to the speaker.

In instances in which the producing of the output includes instructing and/or causing a refreshable braille display to produce tangible braille characters corresponding to the summary, the synthetic speech and tangible braille module 113c may translate the content of the summary into executable instructions which cause the refreshable braille display to generate tangible braille characters corresponding to the content of the summary.

Referring to FIG. 2D, at step 213, after the summary has been produced through the output mechanism(s) 115, the user computing device 110 may receive a user selection of one or more of the tag sequences included in the summary via input mechanism(s) 114 for production in its entirety (e.g., production of the entire amount of the content associated with the selected tag sequence). The user selection may comprise any one, or combination of, a voice command and touch input.

At step 214, upon receiving the user selection of one or more of the tag sequences, the synthetic speech and tangible braille module 113c may produce the entirety of the content corresponding to the one or more selected tag sequences of the summary. The production of the content by the synthetic speech and tangible braille module 113c may be performed in a manner similar to that described above in regard to step 212.

At step 215, the machine learning module 113e may be updated based on the user's selection of the one or more tag sequences of the summary. As such, the machine learning module 113e may be customized to the user's preferences and may function in relation to the user information stored at server infrastructure 120 and/or user profile database 113a. Thus, as time progresses and a user uses the computing device 110 more, the machine learning module 113e may aide the user computing device 110 in performing one or more of the above-mentioned steps. For example, if during utilization of user computing device 110, a user regularly selects a particular category of content to be produced in its entirety, the intelligent content parsing module 113b and the synthetic speech and tangible braille module 113c may iteratively refine their processing to account for such user behavior.

Figure 3:
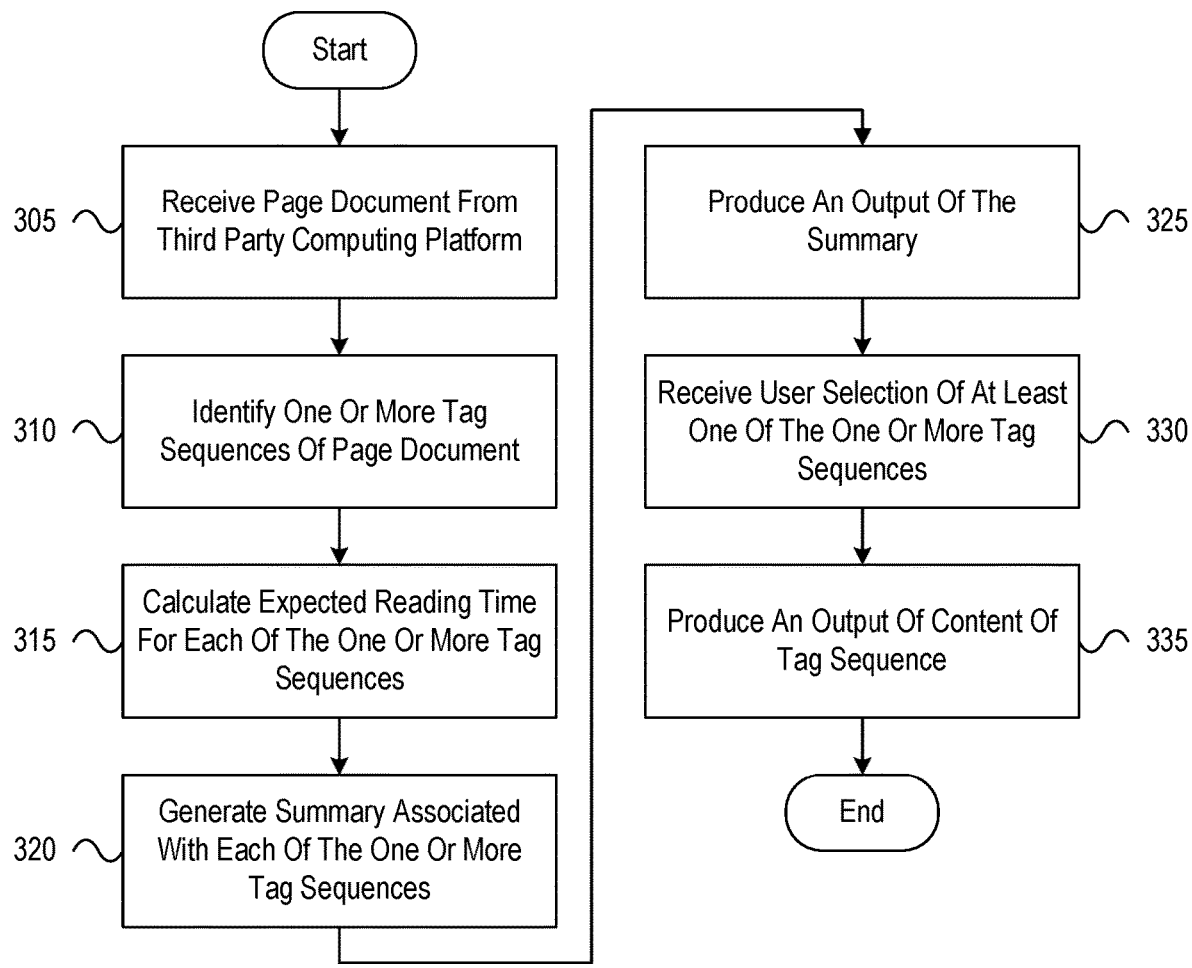
FIG. 3 depicts a first illustrative method for parsing page content and synthesizing content for audio and/or braille output in accordance with one or more example embodiments.

FIG. 3 depicts a first illustrative method for parsing page content and synthesizing content for audio and/or braille output in accordance with one or more example embodiments. Referring to FIG. 3, at step 305, a user computing device having at least one processor, communication interface, input mechanism, output mechanism, and memory, may receive, via the communication interface, from a third party computing platform, a page document corresponding to a uniform resource locator (URL) of the third party computing platform. At step 310, the user computing device may identify one or more tag sequences of the page document, wherein each of the one or more tag sequences include a start tag, an end tag, and content therebetween. At step 315, the user computing device may calculate an expected reading time for each of the one or more tag sequences based on the content included between the start tag and the end tag. At step 320, the user computing device may generate a summary associated with each of the one or more tag sequences of the page document, wherein the summary comprises a recapitulation of the content between the start tag and the end tag and the expected reading time. At step 325, the user computing device may produce, via the at least one output mechanism, an output of the summary. At step 330, the user computing device may receive, via the at least one input mechanism, from the user of the computing device, a selection of at least one of the one or more tag sequences. At step 335, the user computing may produce, via the at least one output mechanism, an output of the content between the start tag and the end tag of the tag sequence in a timeframe corresponding to the expected reading time.

As stated above, in some arrangements, server infrastructure 120 may be configured to interface with user computing device 110 to perform one or more aspects of the intelligent content parsing and synthetic speech and tangible braille production described herein. In such arrangements, user computing device interface module 123f of server infrastructure 120 may receive an interface and/or connection request from web browser module 113d of user computing device 110. After an interface and/or connection between user computing device interface module 123f of server infrastructure 120 and user computing device 110 has been established, server infrastructure 120 may be configured to perform one or more aspects of the intelligent content parsing and synthetic speech and tangible braille production described herein via the user profile database 123a, intelligent content parsing module 123b, synthetic speech and tangible braille module 123c, request proxy module 123d, and machine learning module 123e, as described in further detail below.

FIGS. 4A, 4B, 4C, 4D, and 4E depict a second illustrative event sequence for parsing page content and synthesizing content for audio and/or braille output in accordance with one or more example embodiments. In the second illustrative event sequence, processing of a page document is focalized at server infrastructure 120. However, as mentioned above, processing of a page document may, in some instances, be performed by user computing device 110 in combination with server infrastructure 120.

Figure 4A:
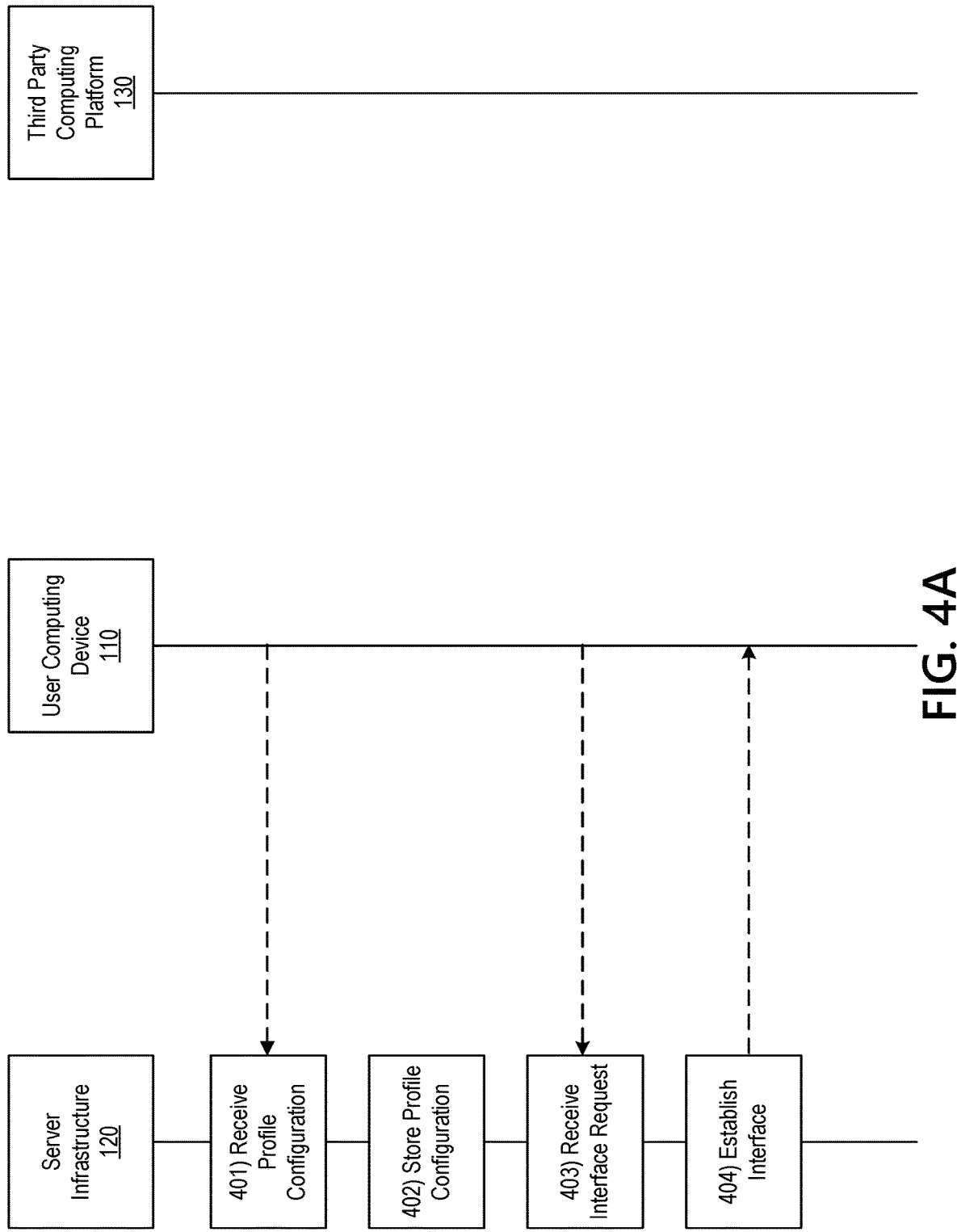

Referring to FIG. 4A, at step 401, server infrastructure 120 may receive user profile configuration information from a user computing device 110 by way of communication interface(s) 122. User profile configuration information provided by the user may include one or more of a username, password, user type (e.g., age, gender, employment status, and the like), tag sequence preferences (e.g., header, paragraph, input, image, and the like), content preferences (e.g., sports, international news, entertainment, and the like), content type preferences (e.g., text, audio, video, and the like), summary order preferences (e.g., order of content of summary reproduced during output), content resumption preferences (e.g., where to commence content reproduction when landing on a web page for a second time), preferences to engage with hyperlinks to external pages, word per minute reproduction rate, and the like.

At step 402, the server infrastructure 120 may store the user profile information in memory 123. In particular, the server infrastructure 120 may store the user profile configuration information in user profile database 123a of memory 123. Thus, upon receipt and storage of the user profile configuration information, server infrastructure 120 may allocate memory within memory 123 and, specifically, user profile database 123a, for the user. In some instances, the user profile information received at step 401 may be compressed using prefix codes, Huffman codes, arithmetic coding, run-length coding, move-to-front coning, residual coding, context coding, Lempel-Ziv algorithms, Burrows Wheeler algorithms, scalar and vector quantization, and/or wavelet, fractal, and model-based compression and/or may be encrypted in accordance with SSL, Triple DES, RSA, Blowfish, Twofish, AES, or other symmetric encryption methods, asymmetric encryption methods, and hashing encryption methods. In such instances, server infrastructure 120 may decompress and/or decrypt the user profile information according to the methods by which it was compressed and/or encrypted prior to storing the information.

At step 403, user computing device interface module 123f of server infrastructure 120 may receive an interface and/or connection request from web browser module 113d of user computing device 110. The request may include a username and password corresponding to a user of the user computing device 110, as well as appropriate permissions data to enable server infrastructure 120 to remotely control one or more hardware and/or software features of user computing device 110.

At step 404, the user computing device interface module 123f of server infrastructure 120 may establish and/or activate the interface and/or connection with user computing device 110. In some instances, the interface and/or connection may be established and/or activated responsive to server infrastructure validating the username and password information corresponding to the user provided at step 403.

Figure 4B:
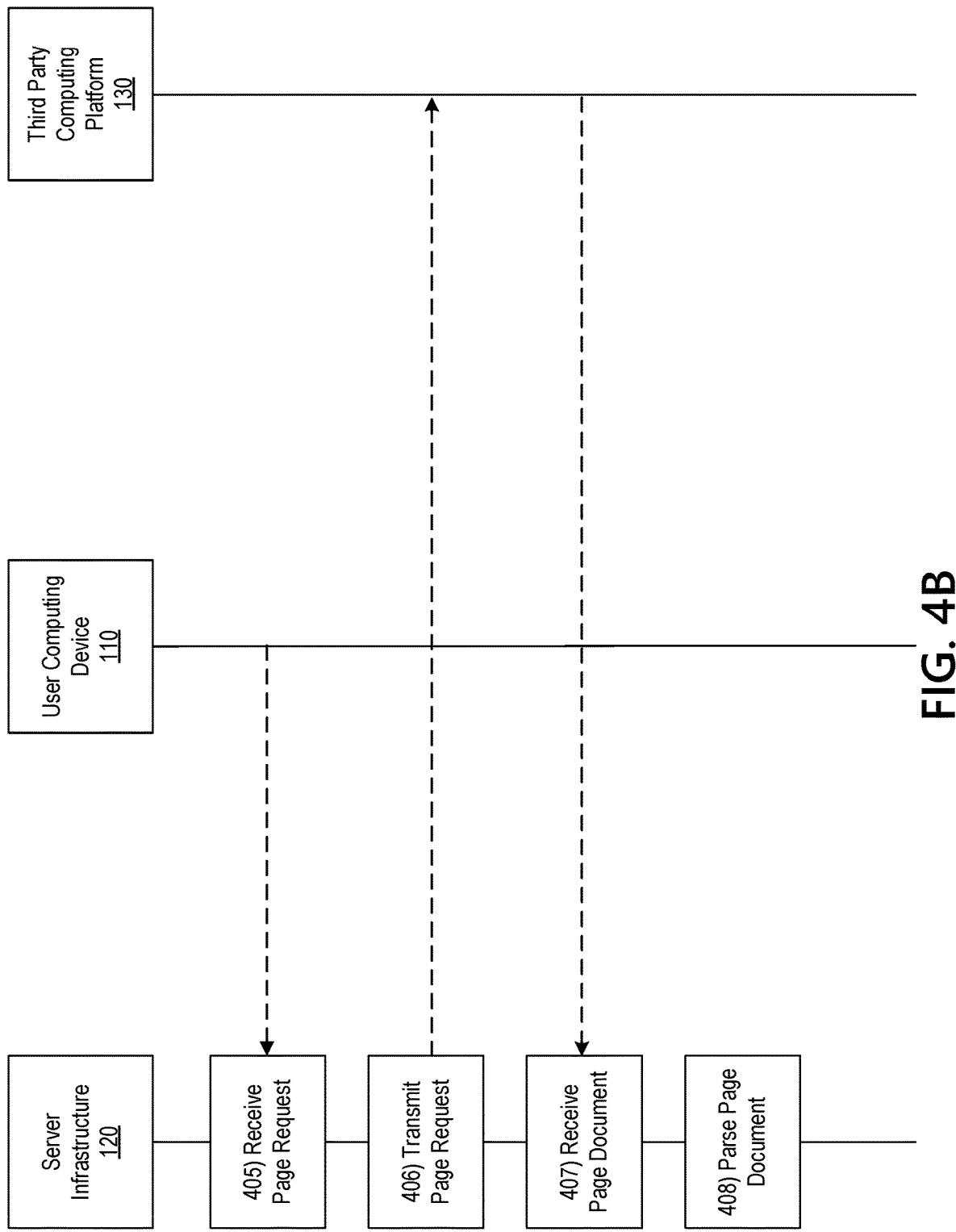

Referring to FIG. 4B, at step 405, a page request may be received from web browser module 113d of user computing device 110 at computing device interface module 123f of server infrastructure 120. After receiving the page request, the computing device interface module 123f may be configured to route the request to request proxy module 123d.

At step 406, the request proxy module 123d may transmit the page request received from the web browser module 113d of user computing device 110 to the intended destination (e.g., URL associated with third party computing platform 130). At step 407, the request proxy module 123d may receive a page document corresponding to page request from the third party computing platform 130 on behalf of the web browser module 113d of user computing device 110.

At step 408, the intelligent content parsing module 123b of server infrastructure 120 may parse the page document corresponding to the URL of the third party computing platform 130 to generate a document object model (DOM) of the page document and produce one or more tag sequences. As stated above, each of the one or more tag sequences may comprise a start tag and an end tag. Situated in between the start tag and end tag, there may be positioned content such as text, forms, applications, images, audio tracks, PDF documents, Word documents, advertisements, table content, and videos, as well as meta data associated with the content.

Figure 4C:
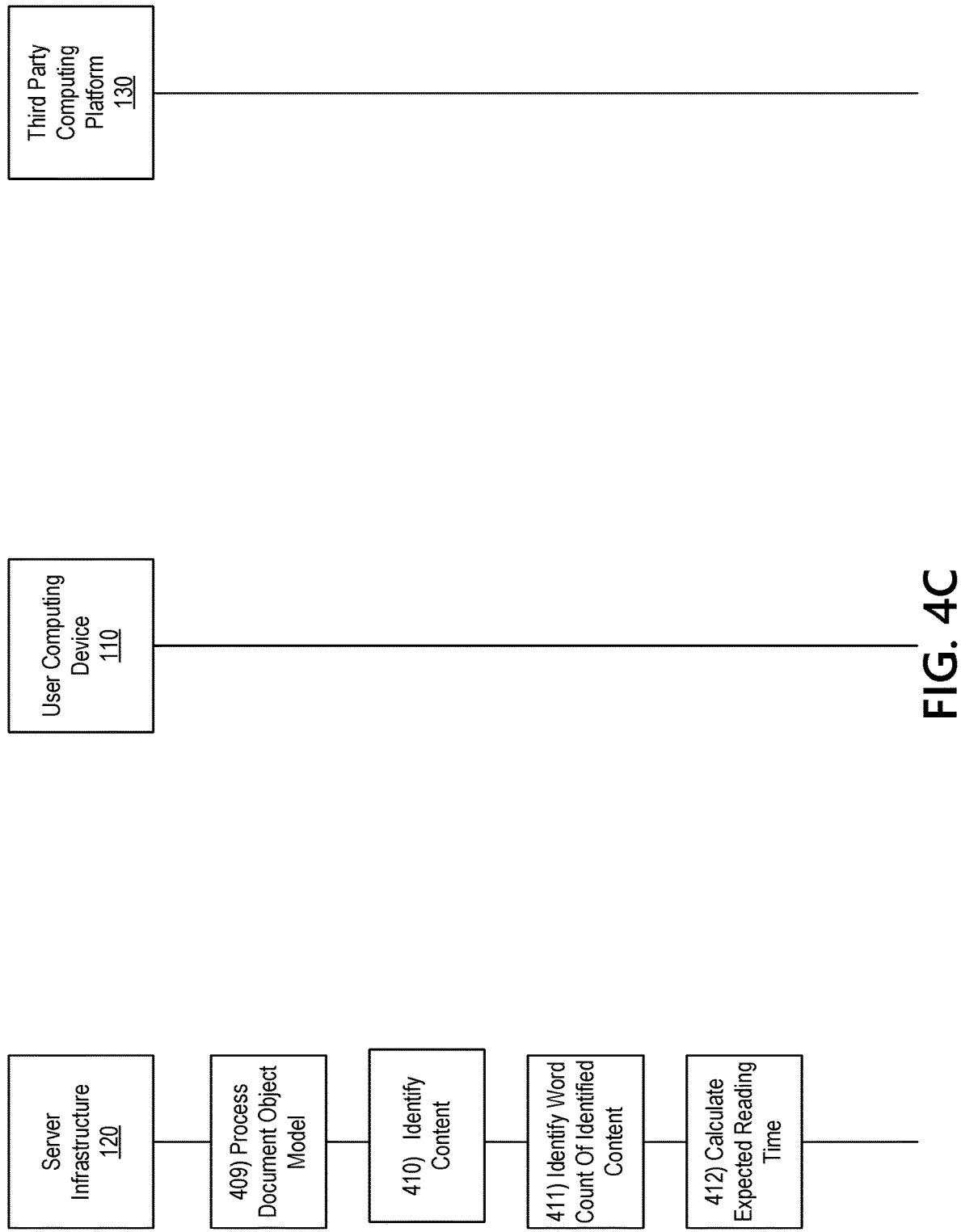

Referring to FIG. 4C, at step 409, the intelligent content parsing module 123b of server infrastructure 120 may process the DOM of the page document to identify and/or classify each of the one or more tag sequences based on a type of tag sequence. For instance, the types of tag sequences may include title, body, header(s), paragraph(s), form(s), input(s), image(s), audio/video(s), link(s), list(s), table(s), style and semantic(s), meta info, script(s), applet(s), and the like. In some cases, the tag sequences may be identified and/or classified by the intelligent content parsing module 123b in relation to user preferences. For example, the intelligent content parsing module 123b may determine tag preferences of a user by extracting such information from user profile database 123a. The intelligent content parsing module 123b may then compare the DOM of the page document against the user's tag preferences to identify and/or classify each of the one or more tag sequences corresponding to the user's preferences. Alternatively, the intelligent content parsing module 123b may process the DOM of the page document to identify and/or classify each of the one or more tag sequences corresponding to one or more predetermined types of tag sequence (e.g., header, form, and the like).

At step 410, the intelligent content parsing module 123b of server infrastructure 120 may identify content included between the start tag and end tag of the tag sequences. As stated above, such content may include text, forms, applications, images, audio tracks, PDF documents, Word documents, advertisements, table content, and videos, as well as any accompanying meta info. In some instances, the content may be identified by the intelligent content parsing module 123b based on the content preferences and/or content type preferences of the user. For instance, the intelligent content parsing module 123b may extract user content preference data and/or content type preference data from user profile database 123a. Subsequently, the intelligent content parsing module 123b may compare the content included between the start tag and end tag of each of the one or more tag sequences to the user content preference data and/or content type preference data to identify content within the page document pertinent to the user. As will be described in further detail below, such an identification of content as performed in step 410 may be assisted by machine learning module 123e.

At step 411, the intelligent content parsing module 123b may identify a word count of the content identified at step 410. In particular, the intelligent content parsing module 123b may extract textual information associated with the identified content of each of the one or more tag sequences. After doing so, the intelligent content parsing module 123b may process the extracted textual information associated with the identified content to determine a total word count associated with the identified content. In some instances, the total word count data may be extracted for each item of identified content.

In other instances, the content may be grouped according to sections (e.g., sports, news, technology, and the like) and the total word count data may be extracted corresponding to the totality of pieces of content within each of the particular sections. Additionally, with respect to non-text based content (e.g., images, audio tracks, videos, and the like), interactive content (e.g., fillable forms, applications, and the like), and/or junk content (e.g., advertisements, and the like), the intelligent content parsing module 123b may be configured to identify a quantity associated with each type of content and information related thereto allowing for calculation and/or estimation of an estimated time of reproduction to be determined. For example, the intelligent content parsing module 123b may identify a total number of sections, fillable forms, fillable form fields, images, videos, audio tracks, PDF and Word documents, table content, and advertisements as well as meta data to be used in the calculation and/or estimation of an estimated time of reproduction.

At step 412, the intelligent content parsing module 123b of server infrastructure 120 may compare the total word count data of the identified content to the word per minute reproduction rate associated with the user and received from user computing device 110 at step 401 to calculate and/or determine an expected reading and/or reproduction time associated with each item of identified content. In instances in which a word per minute reproduction rate was not provided by the user, a predetermined baseline rate may be utilized.

In some cases, the intelligent content parsing module 123b may calculate and/or determine an expected reading and/or reproduction time for the identified total number of sections, fillable forms, fillable form fields, images, videos, audio tracks, PDF and Word documents, table content, and advertisements. In regard to the total number of fillable form fields, the intelligent content module 123b may further calculate and/or determine an expected time to provide inputs to the total number of fillable form fields. Additionally and/or alternatively, the intelligent content parsing module 123b may calculate and/or determine an expected reading and/or reproduction time for the entire page document.

Referring to FIG. 4D, at step 413, the intelligent content parsing module 123b may sort the tag sequences of the DOM of the page document in an order from a first tag sequence to a last tag sequence based on one or more of the tag preference data, content preference data, content type preference data, summary order preference data, and content resumption preference data provided by the user.

At step 414, the intelligent content parsing module 123b of the server infrastructure 120 may generate a summary associated with each of the one or more tag sequences of the page document. In particular, the summary generated by the intelligent content parsing module 123b for each of the tag sequences may comprise a recapitulation of the content (e.g., a predetermined amount of words of the content) between the start tag and the end tag and the expected reading and/or reproduction time to produce the entirety of the content included in the tag sequence.

In some instances, the summary associated with each of the one or more tag sequences of the page document is generated in the sorted order (e.g., in the sorted order based on one or more of the tag preference data, content preference data, content type preference data, summary order preference data, and content resumption preference data provided by the user). Thus, as described below, each of the one or more tag sequences of the page document of the summary may be reproduced for the user in the sorted order based on the preferences of the user. In doing so, the content of any given third party computing platform may be presented to the user, by server infrastructure 120, in an order determined by the user as opposed to a predetermined top-to-bottom manner. The user determined content reproduction method may provide the technical benefits of reducing processing load at server infrastructure 120, as well as an accompanying reduction in energy expenditures associated with computing processing in comparison to predetermined top-to-bottom content reproduction methods. Furthermore, the user determined content reproduction method may be of a benefit to the user in that content of the highest meaning to the user is presented most immediately, regardless of the position of such content in the page document.

At step 415, the synthetic speech and tangible braille module 123c of the user computing device 110 may activate output mechanism(s) 115 of user computing device 110 to produce an output of the summary in relation to the sorted order of the tag sequences of the summary. As stated above, the summary may include a recapitulation of the content (e.g., a predetermined amount of words of the content) between the start tag and the end tag and the expected reading and/or reproduction time to produce the entirety of the content included in the tag sequence. In some instances, the producing of the output by the synthetic speech and tangible braille module 123c may comprise instructing, controlling, and/or causing a speaker of the user computing device 110 to produce sound corresponding to the summary. Additionally and/or alternatively, the producing of the output by the synthetic speech and tangible braille module 123c may comprise instructing, controlling, and/or causing a refreshable braille display of the user computing device 110 to produce tangible braille characters corresponding to the summary.

In instances in which the producing of the output includes instructing and/or causing a speaker to produce sound corresponding to the summary, the synthetic speech and tangible braille module 123c may first perform text-to-speech synthesis of the summary. For instance, the synthetic speech and tangible braille module 123c may perform text analysis of the summary to develop an utterance composed of words. Subsequently, the synthetic speech and tangible braille module 123c may perform linguistic analysis on the utterance composed of words including phasing, intonation, and duration to produce an utterance composed of phonemes. Next, the synthetic speech and tangible braille module 123c may produce a wave form generation of the utterance composed of phonemes. After the wave form generation has been produced, the synthetic speech and tangible braille module 123c may instruct and/or cause the speaker to produce sound corresponding to the summary by transmitting the generated wave form to the speaker.

In instances in which the producing of the output includes instructing and/or causing a refreshable braille display to produce tangible braille characters corresponding to the summary, the synthetic speech and tangible braille module 123c may translate the content of the summary into executable instructions which cause the refreshable braille display to generate tangible braille characters corresponding to the content of the summary.

At step 416, after the summary has been produced through the output mechanism(s) 115, the server infrastructure 120 may receive information from user computing device 110 corresponding to a user selection of one or more of the tag sequences included in the summary for production in its entirety (e.g., production of the entire amount of the content associated with the selected tag sequence).

Referring to FIG. 4E, at step 417, upon receiving the user selection of one or more of the tag sequences, the synthetic speech and tangible braille module 123c may activate output mechanism(s) 115 of user computing device 110 to produce an output of the entirety of the content corresponding to the one or more selected tag sequences of the summary. The production of the content by the synthetic speech and tangible braille module 123c may be performed in a manner similar to that described above in regard to step 415.

At step 418, the machine learning module 123e may be updated based on the user's selection of the one or more tag sequences of the summary. As such, the machine learning module 123e may be customized to the user's preferences and may function in relation to the user information stored at user profile database 123a. Thus, as time progresses, the machine learning module 123e may aide the server infrastructure 120 in performing one or more of the above-mentioned steps. For example, if during utilization of server infrastructure 120, a user regularly selects a particular category of content to be produced in its entirety, the intelligent content parsing module 123b and the synthetic speech and tangible braille module 123c may iteratively refine their processing to account for such user behavior.

Figure 5:
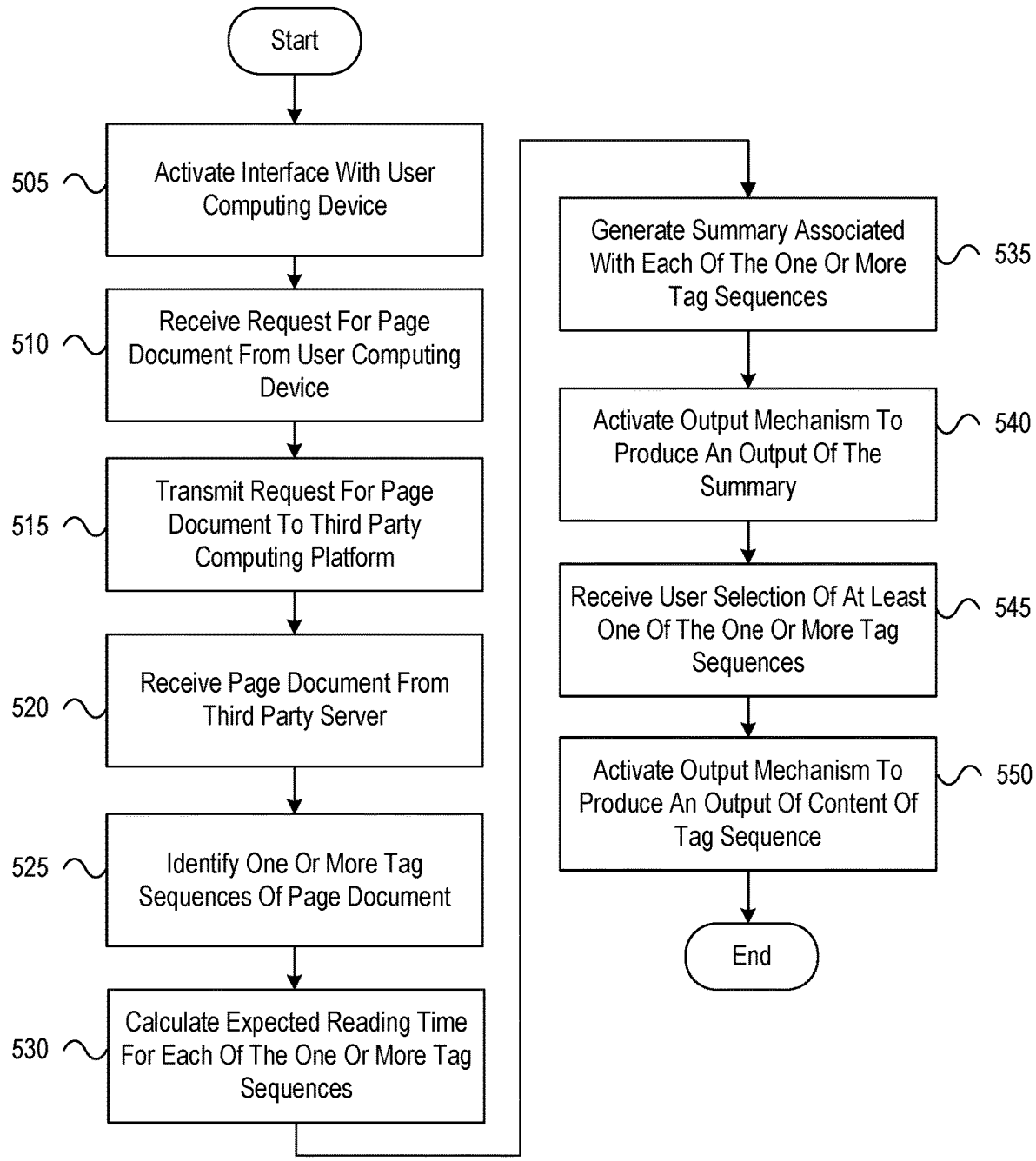
FIG. 5 depicts a second illustrative method for parsing page content and synthesizing content for audio and/or braille output in accordance with one or more example embodiments.

FIG. 5 depicts a second illustrative method for parsing page content and synthesizing content for audio and/or braille output in accordance with one or more example embodiments. Referring to FIG. 5, at step 505, a server infrastructure having at least one processor, communication interface, and memory, may activate an interface, via the communication interface, with a user computing device. At step 510, the server infrastructure may receive, via the activated interface, from the user computing device, a request for a page document corresponding to a uniform resource locator (URL) of a third party computing platform. At step 515, the server infrastructure may transmit, via the communication interface, the request for the page document to the third party computing platform. At step 520, the server infrastructure may receive, via the communication interface, from the third party computing platform, the page document corresponding to the URL of the third party computing platform. At step 525, the server infrastructure may identify one or more tag sequences of the page document, wherein each of the one or more tag sequences include a start tag, an end tag, and content therebetween. At step 530, the server infrastructure may calculate an expected reading time for each of the one or more tag sequences based on the content included between the start tag and the end tag. At step 535, the server infrastructure may generate a summary associated with each of the one or more tag sequences of the page document, wherein the summary comprises a recapitulation of the content between the start tag and the end tag and the expected reading time. At step 540, the server infrastructure may activate, via the activated interface, an output mechanism of the user computing device to produce an output of the summary. At step 545, the server infrastructure may receive, via the activated interface, from a user of the computing device, a selection of at least one of the one or more tag sequences. At step 550, the server infrastructure may activate, via the activated interface, the output mechanism of the user computing device to produce, via the at least one output mechanism, an output of the content between the start tag and the end tag of the tag sequence in a timeframe corresponding to the expected reading time.

The various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computing device, comprising:
at least one processor;
at least one output mechanism communicatively coupled to the at least one processor;
a communication interface communicatively coupled to the at least one processor; and
memory storing computer-readable instructions that, when executed by the at least one processor, cause the computing device to:
receive, from a user of a third party computing platform, information corresponding to one or more profile configurations associated with the user;
receive, via the communication interface, from the third party computing platform, a page document corresponding to a uniform resource locator (URL) of the third party computing platform;
identify a plurality of tag sequences of the page document, wherein each tag sequence of the plurality of tag sequences includes a start tag, an end tag, and content therebetween;
based on the profile configurations associated with the user, sort the identified plurality of tag sequences of the page document in an order from a first tag sequence to a last tag sequence;
calculate an expected reading time for each tag sequence of the plurality of tag sequences based on the content included between the start tag and the end tag;
generate a summary associated with each tag sequence of the plurality of tag sequences of the page document, wherein the summary comprises a recapitulation of the content between the start tag and the end tag and the expected reading time and wherein the summary associated with each tag sequence of the plurality of tag sequences is generated in an order corresponding to the sorted order; and
produce, via the at least one output mechanism, an output of the summary associated with each tag sequence of the plurality of tag sequences of the page document, the output of each tag sequence being produced in an order corresponding to the sorted order.

2. The computing device of claim 1, wherein identifying the plurality of tag sequences of the page document comprises:
parse the page document corresponding to the URL of the third party computing platform to generate a document object model (DOM) of the page document including the plurality of tag sequences; and
process the DOM of the page document to classify each tag sequence of the plurality of tag sequences based on a type of tag sequence.

3. The computing device of claim 1, wherein calculating the expected reading time for each tag sequence of the plurality of tag sequences based on the content included between the start tag and the end tag comprises:

identify the content included between the start tag and end tag as being text content;

responsive to identifying the content as being text content, process the text content to produce a total word count of the text content; and compare the total word count of the text content with a predetermined word per minute rate to determine the expected reading time.

4. The computing device of claim 1, wherein the at least one output mechanism communicatively coupled to the at least one processor is a speaker, and wherein producing the output of the summary associated with each tag sequence of the plurality of tag sequences of the page document comprises causing the speaker to produce sound corresponding to the summary by the at least one processor communicatively coupled to the speaker.

5. The computing device of claim 1, wherein the at least one output mechanism communicatively coupled to the at least one processor is a refreshable braille display, and wherein producing the output of the summary associated with each tag sequence of the plurality of tag sequences of the page document comprises causing the refreshable braille display to produce tangible braille characters corresponding to the summary by the at least one processor communicatively coupled to the refreshable braille display.

6. The computing device of claim 1, wherein the memory storing computer-readable instructions that, when executed by the at least one processor, cause the computing device to:

after producing the output of the summary associated with each tag sequence of the plurality of tag sequences of the page document in the sorted order:

receive, via at least one input mechanism, from the user of the computing device, a selection of at least one tag sequence of the plurality of tag sequences; and produce, via the at least one output mechanism, an output of the content between the start tag and the end tag of the selected at least one tag sequence in a timeframe corresponding to the expected reading time.

7. The computing device of claim 1, wherein calculating the expected reading time for each tag sequence of the plurality of tag sequences based on the content included between the start tag and the end tag further includes:

identify the content included between the start tag and end tag as being a fillable form;

identify a total number of fillable form fields between the start tag and the end tag; and calculate an expected time to provide inputs to the total number of fillable form fields.

8. The computing device of claim 1, wherein the information corresponding to one or more profile configurations associated with the user includes one or more tag sequence preferences of the user and wherein sorting the identified plurality of tag sequences of the page document in an order from a first tag sequence to a last tag sequence is based, at least in part, on the tag sequence preferences of the user.

9. A method, comprising:

at a computing device comprising at least one processor, at least one output mechanism, at least one input mechanism, memory, and a communication interface:

receiving, by the at least one processor, information corresponding to one or more profile configurations associated with a user;

receiving, by the at least one processor, via the communication interface, from a third party computing platform, a page document corresponding to a uniform resource locator (URL) of the third party computing platform;

identifying, by the at least one processor, a plurality of tag sequences of the page document, wherein each tag sequence of the plurality of tag sequences include a start tag, an end tag, and content therebetween;

based on the profile configurations associated with the user, sorting the identified plurality of tag sequences of the page document in an order from a first tag sequence to a last tag sequence;

calculating, by the at least one processor, an expected reading time for each tag sequence of the plurality of tag sequences based on the content included between the start tag and the end tag;

generating, by the at least one processor, a summary associated with each tag sequence of the plurality of tag sequences of the page document, wherein the summary comprises a recapitulation of the content between the start tag and the end tag and the expected reading time and wherein the summary associated with each tag sequence of the plurality of tag sequences is generated in an order corresponding to the sorted order; and producing, by the at least one processor, via the at least one output mechanism, an output of the summary associated with each tag sequence of the plurality of tag sequences of the page document, the output of each tag sequence being produced in an order corresponding to the sorted order.

10. The method of claim 9, wherein identifying the plurality of tag sequences of the page document comprises:

parsing the page document corresponding to the URL of the third party computing platform to generate a document object model (DOM) of the page document including the plurality of tag sequences; and processing the DOM of the page document to classify each tag sequence of the plurality of tag sequences based on a type of tag sequence.

11. The method of claim 9, wherein calculating the expected reading time for each tag sequence of the plurality of tag sequences based on the content included between the start tag and the end tag comprises:

identifying the content included between the start tag and end tag as being text content;

responsive to identifying the content as being text content, processing the text content to produce a total word count of the text content; and comparing the total word count of the text content with a predetermined word per minute rate to determine the expected reading time.

12. The method of claim 9, wherein the at least one output mechanism is a speaker, and wherein producing the output of the summary associated with each tag sequence of the plurality of tag sequences of the page document comprises causing the speaker to produce sound corresponding to the summary by the at least one processor via the speaker.

13. The method of claim 9, wherein the at least one output mechanism is a refreshable braille display, and wherein producing the output of the summary associated with each tag sequence of the plurality of tag sequences of the page document comprises causing the refreshable braille display to produce tangible braille characters corresponding to the summary by the at least one processor via the refreshable braille display.

14. The method of claim 9, comprising:
after producing the output of the summary associated with each tag sequence of the plurality of tag sequences of the page document in the sorted order:
receiving, by the at least one processor, via the at least one input mechanism, from the user of the computing device, a selection of at least one tag sequence of the plurality of tag sequences; and
producing, by the at least one processor, via the at least one output mechanism, an output of the content between the start tag and the end tag of the selected at least one tag sequence in a timeframe corresponding to the expected reading time.

15. The method of claim 9, further including:
identifying, by the at least one processor, the content included between the start tag and end tag as being a fillable form;
identifying, by the at least one processor, a total number of fillable form fields between the start tag and the end tag; and
calculating, by the at least one processor, an expected time to provide inputs to the total number of fillable form fields.

16. One or more non-transitory computer-readable media storing instructions that, when executed by a computing device comprising at least one processor, at least one output mechanism, at least one input mechanism, memory, and a communication interface, cause the computing device to:
receive, from a user of a third party computing platform, information corresponding to one or more profile configurations associated with the user;
receive, via the communication interface, from the third party computing platform, a page document corresponding to a uniform resource locator (URL) of the third party computing platform;
identify a plurality of tag sequences of the page document, wherein each tag sequence of the plurality of tag sequences include a start tag, an end tag, and content therebetween;
based on the profile configurations associated with the user, sort the identified plurality of tag sequences of the page document in an order from a first tag sequence to a last tag sequence;
calculate an expected reading time for each tag sequence of the plurality of tag sequences based on the content included between the start tag and the end tag;
generate a summary associated with each tag sequence of the plurality of tag sequences of the page document, wherein the summary comprises a recapitulation of the content between the start tag and the end tag and the expected reading time and wherein the summary associated with each tag sequence of the plurality of tag sequences is generated in an order corresponding to the sorted order; and
produce, via the at least one output mechanism, an output of the summary associated with each tag sequence of the plurality of tag sequences of the page document, the output of each tag sequence being produced in an order corresponding to the sorted order.

17. The one or more non-transitory computer-readable media of claim 16, storing additional instructions that, when executed by the computing device, cause the computing device to:
parse the page document corresponding to the URL of the third party computing platform to generate a document object model (DOM) of the page document including the plurality of tag sequences; and
process the DOM of the page document to classify each tag sequence of the plurality of tag sequences based on a type of tag sequence.

18. The one or more non-transitory computer-readable media of claim 16, storing additional instructions that, when executed by the computing device, cause the computing device to:
identify the content included between the start tag and end tag as being text content;
responsive to identifying the content as being text content, process the text content to produce a total word count of the text content; and
compare the total word count of the text content with a predetermined word per minute rate to determine the expected reading time.

19. The one or more non-transitory computer-readable media of claim 16, wherein the at least one output mechanism is one or more of a speaker and a refreshable braille display, and wherein producing the output of the summary associated with each tag sequence of the plurality of tag sequences of the page document comprises causing one or more of the speaker to produce sound corresponding to the summary by the at least one processor via the speaker and causing the refreshable braille display to produce tangible braille characters corresponding to the summary by the at least one processor communicatively coupled to the refreshable braille display.

20. The one or more non-transitory computer-readable media of claim 16, storing additional instructions that, when executed by the computing device, cause the computing device to:
after producing the output of the summary associated with each tag sequence of the plurality of tag sequences of the page document in the sorted order:
receive, via at least one input mechanism, from the user of the computing device, a selection of at least one tag sequence of the plurality of tag sequences; and
produce, via the at least one output mechanism, an output of the content between the start tag and the end tag of the selected at least one tag sequence in a timeframe corresponding to the expected reading time.

21. The one or more non-transitory computer-readable media of claim 16, storing additional instructions that, when executed by the computing device, cause the computing device to identify the content included between the start tag and end tag as being a fillable form;
identify a total number of fillable form fields between the start tag and the end tag; and
calculate an expected time to provide inputs to the total number of fillable form fields.

* * * * *